United States Patent [19]
Suzuki et al.

[11] Patent Number: 5,061,950
[45] Date of Patent: Oct. 29, 1991

[54] CAMERA

[75] Inventors: Toyotoshi Suzuki, Tokyo; Yukio Ogawa, Kanagawa, both of Japan

[73] Assignee: Canon Kabushiki Kaisha, Tokyo, Japan

[21] Appl. No.: 519,311

[22] Filed: May 8, 1990

Related U.S. Application Data

[63] Continuation of Ser. No. 228,767, Aug. 4, 1988, abandoned, which is a continuation of Ser. No. 134,614, Dec. 11, 1987, abandoned, which is a continuation of Ser. No. 26,267, Mar. 16, 1987, abandoned.

[30] Foreign Application Priority Data

| Mar. 17, 1986 | [JP] | Japan | 61-58928 |
| Apr. 9, 1986 | [JP] | Japan | 61-81910 |
| Apr. 9, 1986 | [JP] | Japan | 61-81911 |
| Apr. 11, 1986 | [JP] | Japan | 61-83597 |
| Mar. 11, 1987 | [JP] | Japan | 62-55594 |

[51] Int. Cl.$^5$ .............................................. G03B 1/12
[52] U.S. Cl. .............................................. 354/173.11
[58] Field of Search .................... 354/173.1, 173.11

[56] References Cited

U.S. PATENT DOCUMENTS 4,679,926  7/1987  Suzuki et al. .................. 354/173.11

FOREIGN PATENT DOCUMENTS 57-201221  12/1952  Japan .

Primary Examiner—Michael L. Gellner
Attorney, Agent, or Firm—Fitzpatrick, Cella, Harper & Scinto

[57] ABSTRACT

A camera is arranged to effect easy loading of a film. The camera includes a film cartridge chamber for housing a film cartridge having a film therein, a spool for winding the film fed from the film cartridge, and a pressing plate for pressing the film onto an aperture. Also provided is an openable closure for closing the film cartridge chamber, after the film cartridge has been loaded in the film cartridge chamber, while holding a leader portion of the film remaining outside the camera and the other portion of the film housed inside the camera in such a state that it is not subjected to the action of the pressing plate. A first detector detects the leader portion of the film remaining outside the camera, and a second detector detects a closed state of the closure. A film feeder is arranged to initially rewind the film into the film cartridge to retract the leader portion of the film into the camera in response to the detection of the leader portion of the film effected by the first detector, and the detection of the closed state of the closure is effected by the second detector and then operates the film in a film winding direction to cause the film to be wound up onto the spool.

61 Claims, 15 Drawing Sheets

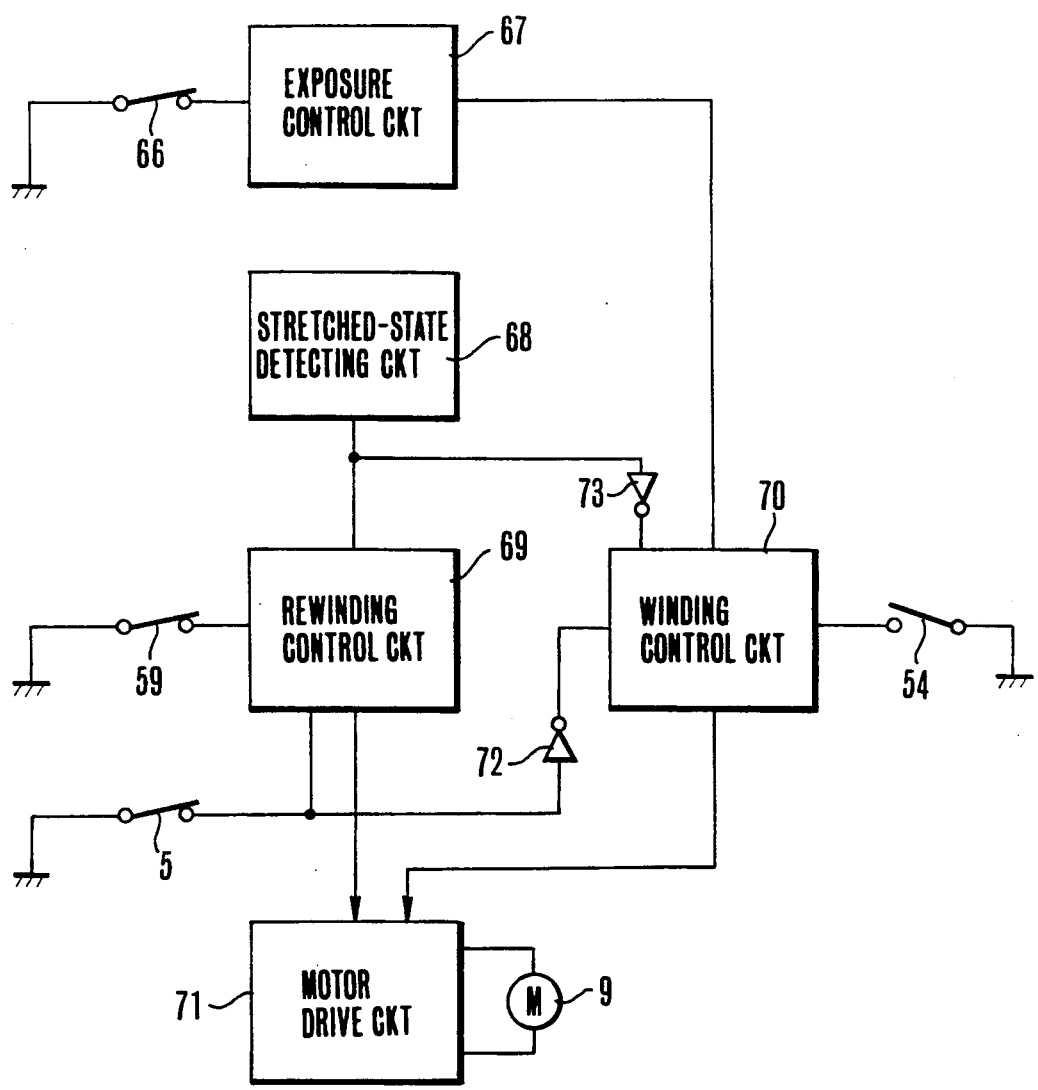

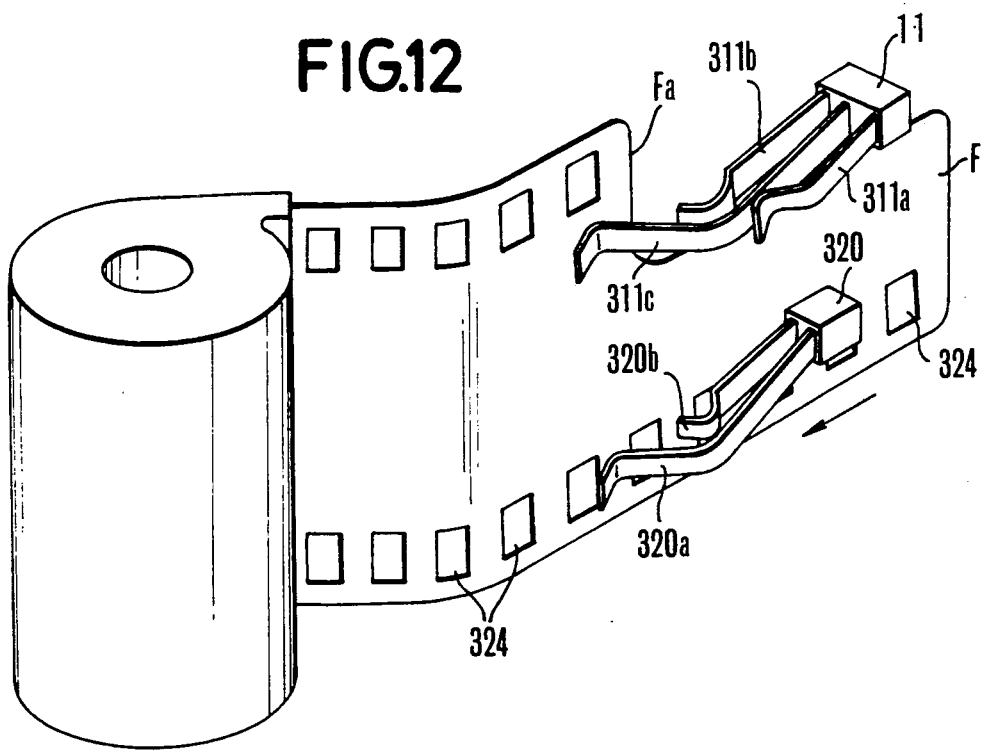
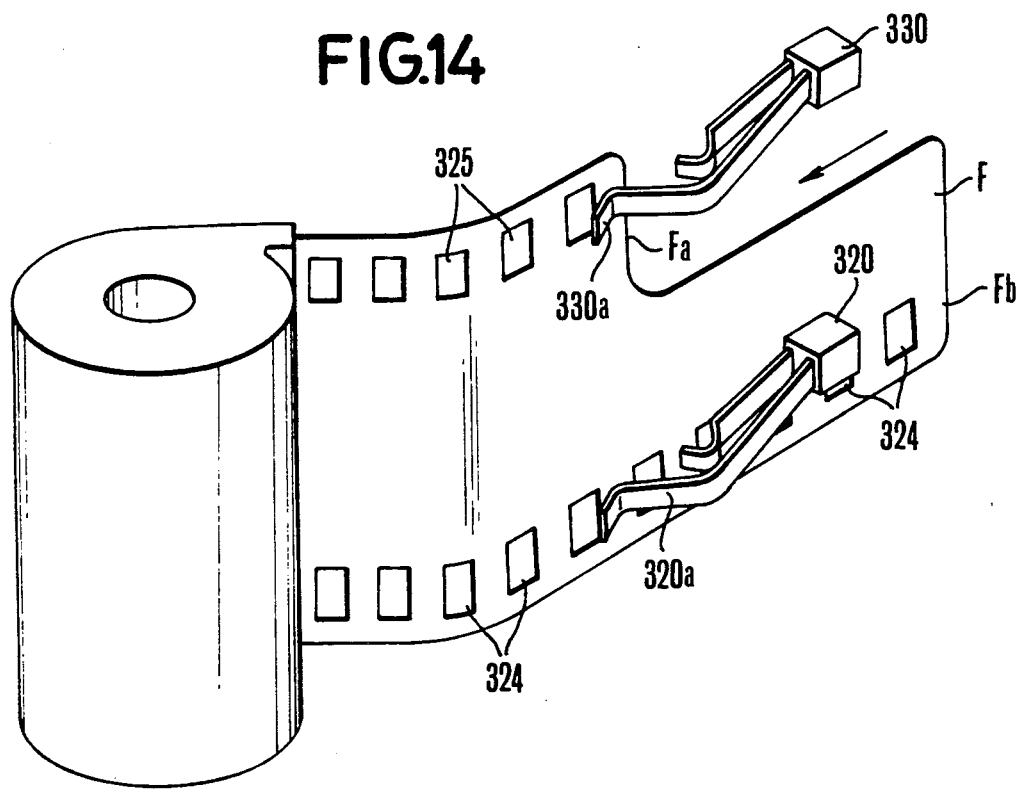

CAMERA

This application is a continuation of application Ser. No. 228,767 filed on Aug. 4, 1988, which is a continuation of application Ser. No. 134,614 filed on Dec. 11, 1987, which is a continuation of application Ser. No. 026,267 filed on Mar. 16, 1987, all three applications now abandoned.

BACKGROUND OF THE INVENTION

1. Field of the Invention

The present invention relates to a camera and, more particularly, it relates to a camera which is arranged to effect loading of a film into the camera in an easy manner.

2. Description of the Related Art

In a conventional camera, loading of a film into the camera requires a relatively complicated operation. In order to improve such inconvenience of the camera, various constructions have been proposed in which the film loading operation is simplified as compared with that required in the conventional camera.

As an example of the heretofore proposed constructions, Japanese Laid-Open Patent Application No. Sho 55-143550 discloses a camera having a film loading system of the type in which a film cartridge is loaded into the camera and a rear cover is closed. While holding a leader portion of a film remaining outside the camera, said leader portion exposed outside the camera is cut by operation of locking said rear cover onto the camera. According to such a film loading system, the troublesome operation of drawing the leader portion of the film out of the film cartridge and then connecting the leader portion to a winding spool is not required, so that the film loading operation is simplified. A film loading system of this type, however, has an important disadvantage in that it requires the provision of a cutter or the like which is arranged on the rear cover of the camera to cut the leader portion of the film. A problem caused by the film loading system of this type could be, for example, a cutter may injure a finger of the user. Moreover, the cut film leader portion may cause a problem of environmental pollution.

SUMMARY OF THE INVENTION

It is an object of the present invention to provide a novel camera in which the problems of the camera having the film loading system of the above type are completely solved.

In order to attain such an object, the present invention provides a camera arranged to effect loading of a film in an easy manner. Such a camera includes a film cartridge chamber for housing a film cartridge having a film therein, a spool for winding the film fed from the film cartridge, a pressing plate for pressing the film onto an aperture, and an openable closure for closing the film cartridge chamber after the film cartridge has been loaded in the film cartridge chamber. The openable closure operates portion of the film outside the camera and the other portion of the film housed inside the camera in such state that it is not subjected to the action of said pressing plate. First detecting means detect the leader portion to the film remaining outside the camera, and second detecting means detect the closed state of said closure. Film and film feeding means arranged to firstly rewind the film into the film cartridge to retract the leader portion of the film into the camera in response to the detection of the leader portion of the film effected by said first detecting means and the detection of the closed state of the closure effected by said second detecting means and then operate the film in film winding direction to cause the film to be wound up onto the spool. According to such construction, at the time of loading the film into the camera, the film can be loaded without paying attention to the length of the leader portion of the film exposed outside the film cartridge, and when the film has been loaded into the camera the leader portion of the film can be processed in suitable and rapid manner, without requiring cutting off the leader portion.

It is another object of the present invention to provide a novel camera which is arranged to avoid leakage of light into the camera even if the camera is used for a long time. In order to attain such object the present invention provides a camera of the above type in which movable light shielding means is disposed in a path through which the leader portion of the film is retracted into the camera.

It is a further object of the present invention to provide a camera which is so arranged that a user can carefully watch the state of the film leader portion being retracted into the camera so that the user may feel no misgivings about the setting of the film in the camera. In order to attain this object, the present invention provides a camera of the above type which includes a speed reducing mechanism for reducing the speed of the film leader portion being retracted into the camera.

The other objects of the present invention will be understood from the detailed explanation of the embodiments of the present invention which will be made with reference to the drawings.

BRIEF DESCRIPTION OF THE DRAWINGS

FIG. 6 is a circuit diagram showing a control circuit according to a first embodiment of the camera shown in FIG. 1.

FIGS. 7(A) and 7(B) are enlarged views showing the construction of a film entrance according to a second embodiment of the camera shown in FIG. 1, in which FIG. 7(A) illustrates the state where a leader portion of a film exists in the film entrance and FIG. 7(B) illustrates the state where the leader portion of the film does not exist in the film entrance.

FIGS. 12 and 13 illustrate a further modified construction of the control part according to the third embodiment of the present invention.

FIGS. 14 and 15 illustrate another modified construction of the control part according to the third embodiment of the present invention.

DETAILED DESCRIPTION OF THE PREFERRED EMBODIMENTS

Now the preferred embodiments of the camera according to the present invention will be described, with reference to the accompanying drawings.

Figure 1:
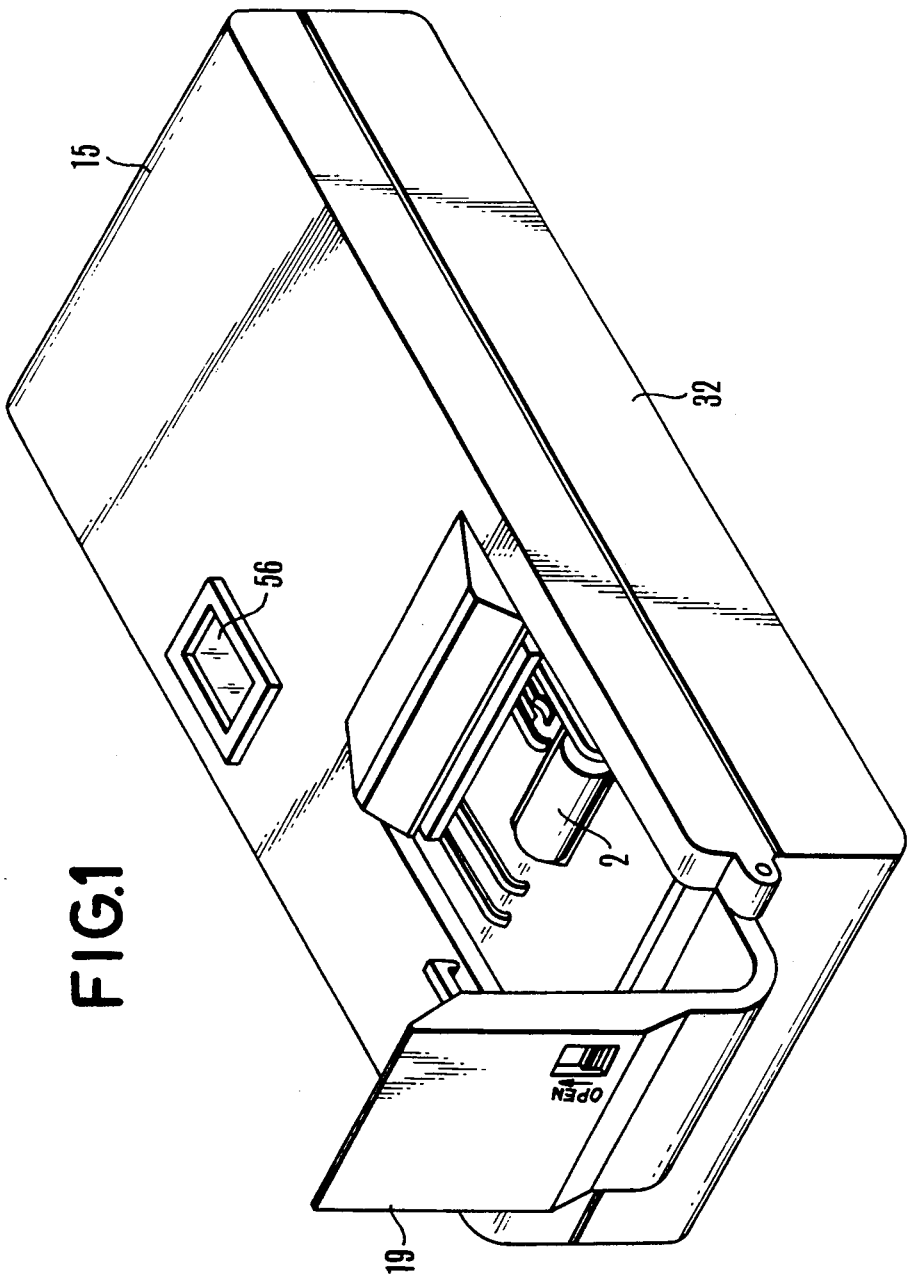
FIG. 1 is a perspective view of the camera according to the present invention, showing the state where an openable closure has been opened but a film cartridge has not yet been loaded into a film cartridge chamber.
Figure 2:
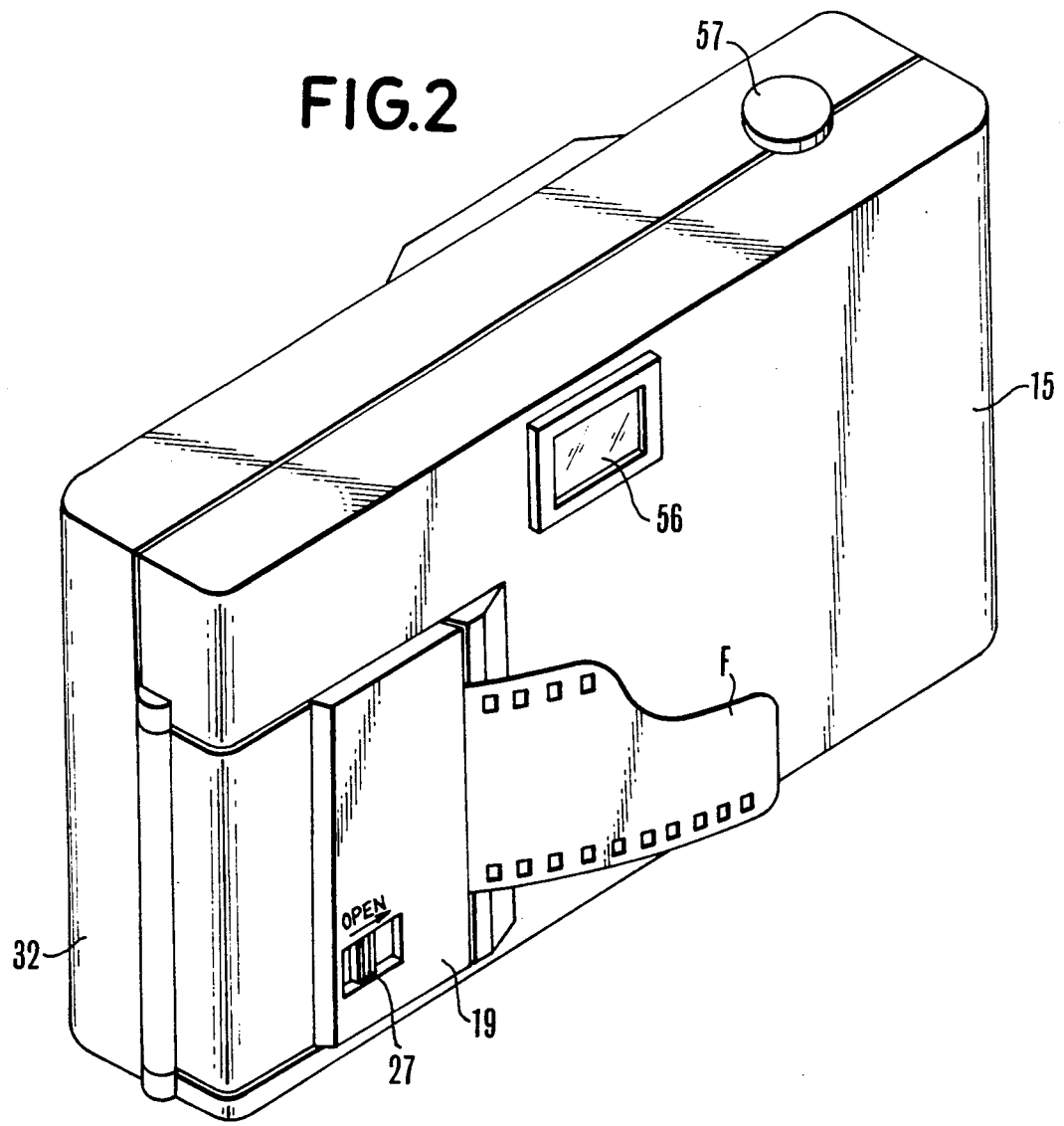
FIG. 2 is a perspective view of the camera shown in FIG. 1, showing the state where the film cartridge has been loaded and the openable closure has been closed.

FIGS. 1-5 illustrate an embodiment of the present invention. FIG. 1 is a perspective view showing the state of the camera where a closure 19 has been opened but a film cartridge has not yet been loaded into the camera. FIG. 2 is a perspective view showing the state where the film cartridge has been loaded into the camera and the closure has been closed, while a leader portion of a film F remains outside the camera.

Figure 3:
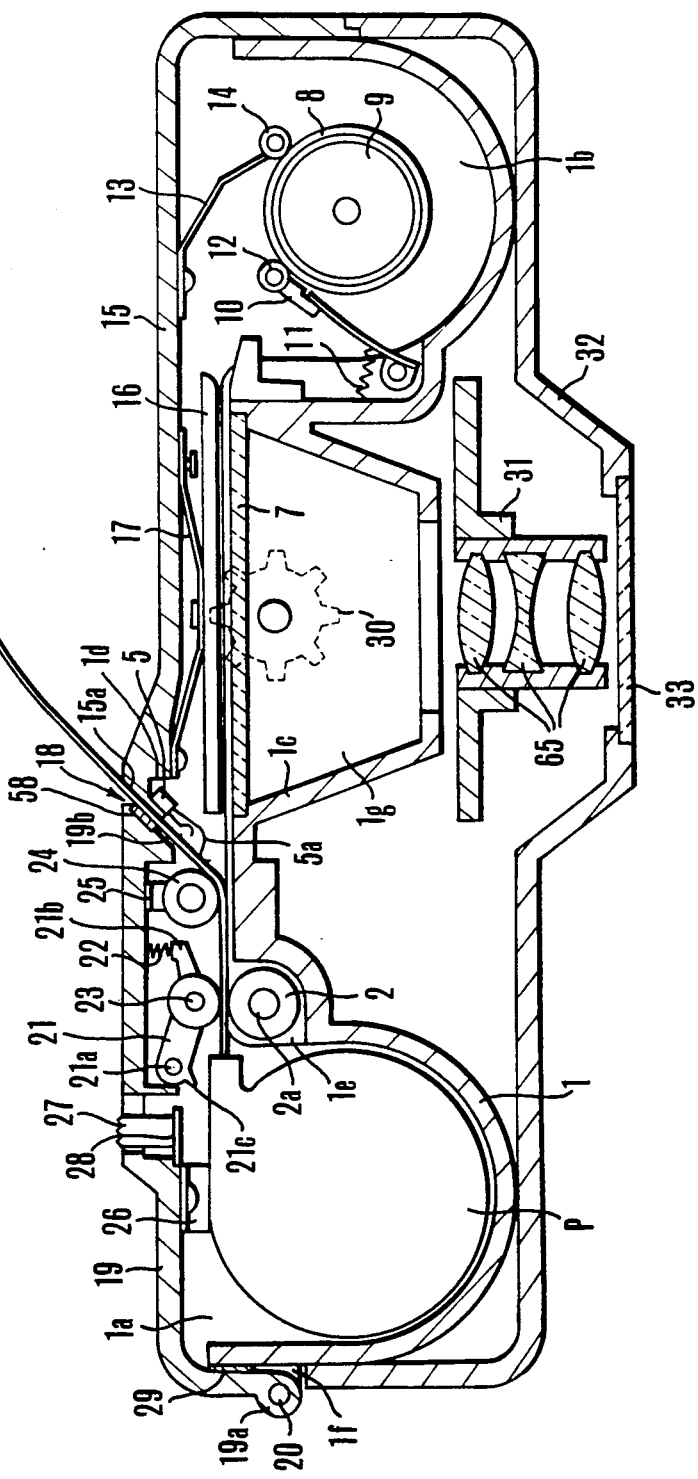
FIG. 3 is a sectional view of the camera shown in FIG. 1, taken along a horizontal plane and viewed from its underside.
Figure 4:
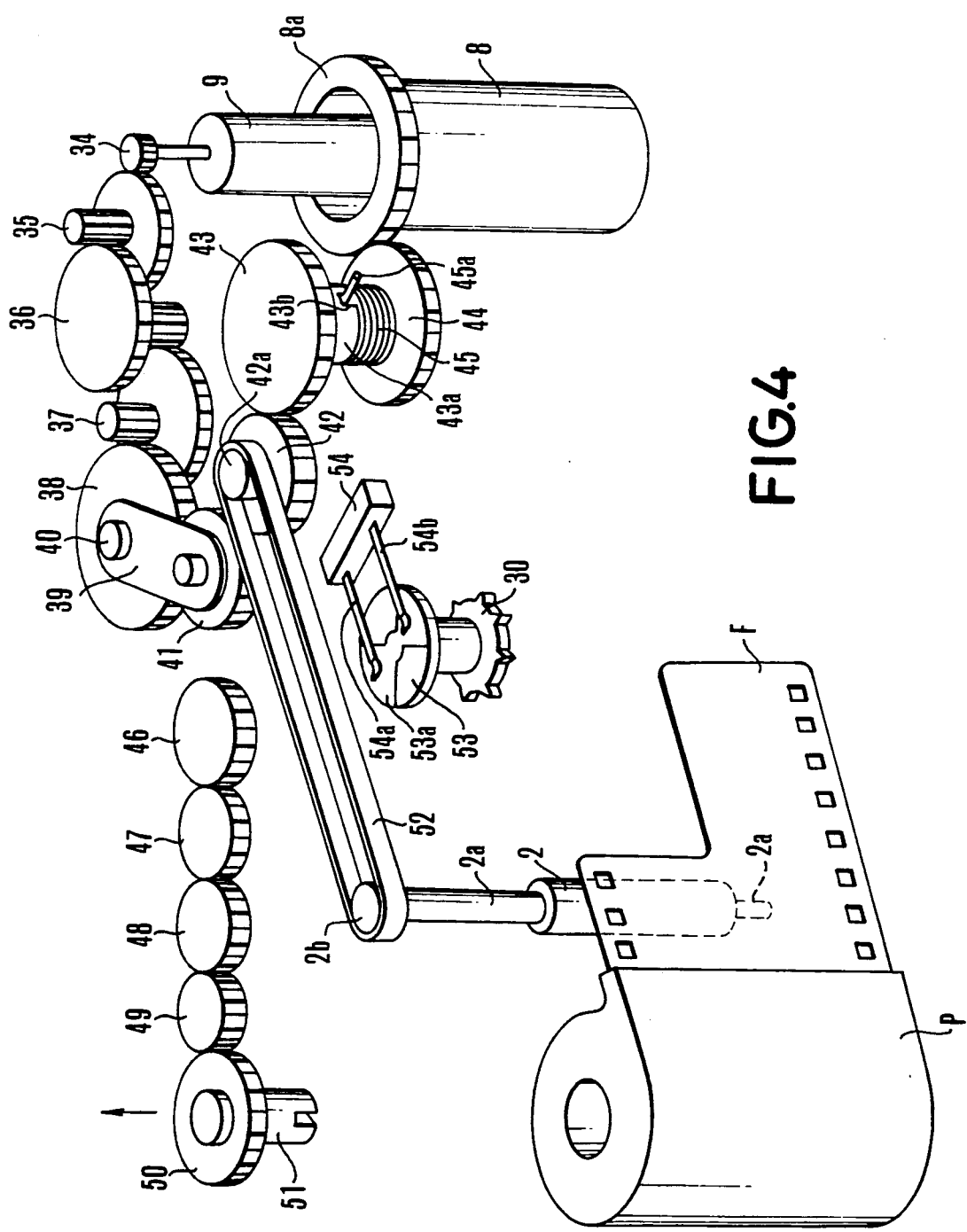
FIG. 4 is a perspective view showing the construction of a film feeding mechanism of the camera shown in FIG. 1.

FIG. 3 is a horizontal sectional view of the camera in which the film cartridge has been loaded, said section being taken along a plane at a central height of the camera and viewed from the underside thereof. As shown in FIG. 3, the camera includes a camera body 1, which has a film cartridge chamber 1a, a spool chamber 1b, an aperture glass holding part 1c, a recess 1d for receiving a film detecting switch, a feeding roller receiving part 1e, a hinge portion 1f and an aperture 1g. A feeding roller 2 is rotatably supported at its shaft 2a on the camera body and has a covering of soft material such as rubber. A pulley 2b is integrally fixed on the upper part of the shaft 2a, as shown in FIG. 4. A film detecting switch 5 is fixed on a rear cover 15. The switch 5 has two contact pieces and one of said contact pieces 5a is arranged to come into contact with the leader portion of the film F. The film detecting switch 5 is a normally closed switch. It is opened when the leader portion of the film F exists and it is closed when the film leader portion is retracted into the camera. An aperture glass 7 is fixed on the glass holding parts 1c of the camera body to completely cover the aperture opening. A spool 8 having a rubber covering is housed in the spool chamber 1b and it is arranged to wind up the film thereon. A motor 9 is housed in the spool 8. A roller plate 10 is pivotally supported on the camera body 1 and it is arranged to urge a rotatable roller 12 against the spool 8 under the action of a spring 11. A roller plate 13 made of spring material is fixed on the rear cover 15 and it serves to push a rotatable roller 14, which is supported at the forward end of said roller plate, against the spool 8.

The rear cover 15 has a tapered surface 15a at its one end which forms a guide surface for introducing the film into the camera. A spring 17 having a pressing plate 16 attached thereto is supported on the cover 15 to press the film onto the aperture glass under the action of said pressing plate. A film entrance 18 is formed between the closure 19 and the rear cover 15 and a light shielding member 58, as hereinafter described, is fixed at the film entrance 18, in order to prevent light from entering into the camera through the film entrance after the film leader portion F has been retracted into the camera. A film cartridge P is housed in the film cartridge chamber 1a. The closure 19 is pivotally attached at its hinge portion 19a on the hinge portion 1f of the camera body through a pivot shaft 20. The closure 19 has a tapered surface 19b at its end, which forms a part of the film entrance 18.

A roller plate 21 is pivotally supported on the closure 19 at a pivot axis 21a and it is energized at its one end 21b by a spring 22 so that it is subjected to a rotating force in a clockwise direction. A first guide roller 23 is pivotally supported by said roller plate 21 and said roller 23 is arranged so that it comes into contact with the film F. The roller plate 21 has a stopper portion 21c integrally formed therewith, which serves to stop the closure at a predetermined position when said closure has been opened. A second guide roller 24 is pivotally supported by a holder 25 fixed on the closure 19. A spring 26 for pressing the film cartridge is fixed on the closure 19 and it serves to prevent the film cartridge P from floating or rising in the cartridge chamber, under the action of the spring force thereof. A closure opening and closing knob 27 is disposed inside the closure 19 and it is connected to a closure opening and closing lever 28, as hereinafter described.

The camera further includes a light shielding member 29 and a sprocket 30. A front plate unit 31 is fixed in the camera body 1, at a place not shown in FIG. 3, and it supports a photographing lens group 65. A front cover 32 is disposed at the front side of the camera and a protector glass 33 is fixed to the front cover 32 at the front of the photographing lens group.

As shown in FIG. 2, a finder eyepiece 56 is disposed in the rear cover and a release button 57 is disposed at the top.

Figure 5:
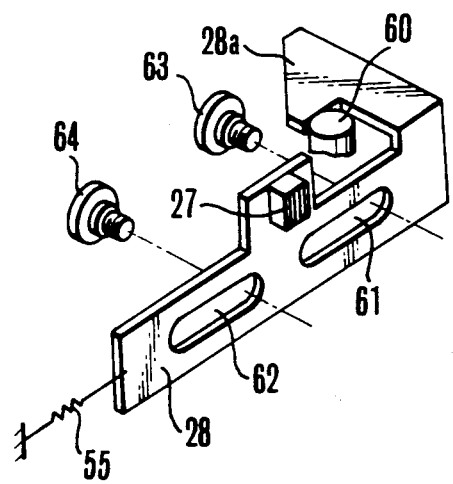
FIG. 5 is an exploded perspective view showing a closure opening and closing lever mounted on the rear side of the closure of the camera shown in FIG. 1.

FIG. 5 illustrates the closure opening and closing lever 28 which is slidably disposed on the inside of the closure 19. As shown in FIG. 5, the closure opening and closing knob 27 is fixed to the closure opening and closing lever 28, which has two slots 61 and 62 formed therein. The lever 28 is slidably supported on the closure 19 by means of stepped screws 63 and 64 threaded through the slots 61 and 62 into the closure 19 and it is energized to the left by means of a spring 55. A locking pin 60 is disposed in the camera body and the closure 19 is held closed by the engagement of a hook portion 28a of said closure opening and closing lever 28 with said locking pin 60. When it is desired to open the closure 19, the knob 27 is moved to the right, until the hook portion 28a of the lever 28 is disengaged from the locking pin 60, whereby the closure 19 is allowed to be opened.

FIG. 4 is a perspective view showing a gear train which is used in a film winding and rewinding mechanism. In FIG. 4, the same parts as those shown in FIGS. 1-3 are designated by the same numerals as used in these figures. In general, the gears as shown in FIG. 4 are rotatably supported on a winding base plate (not shown) or the camera body 1, unless indicated otherwise.

A motor 9 is housed in the spool 8 and a pinion gear 34 is fixedly connected to an output shaft of said motor. Reduction gears 35-37, each of which consists of a larger gear and a smaller gear integrally connected together, are engaged with said pinion gear 34, whereby the rotation of the motor is reduced and transmitted to the gear 37, which produces a high torque. A sun gear 38 engages with the reduction gear 37, and said sun gear and a planet lever 39 are supported on a shaft 40. A planet gear 41 is in meshing engagement with the sun gear 38 and said planet gear is supported by the planet lever 39 so that the former is rotatable relatively to the latter, with a suitable friction being held therebetween. An intermediate gear 42 is disposed at a position where it is engageable with said planet gear 41, and a pulley 42a is fixed on the upper part of said intermediate gear 42.

A friction gear assembly including a first gear 43 and a second gear 44 is arranged to connect the intermediate gear 12 with a gear 8a integrally formed on the spool 8. The first gear 43 is in engagement with the intermediate gear 42 and has a collar portion 43a formed at the lower portion thereof. A recess 43b is formed in a part of said collar portion. The second gear 44 is in engagement with the gear 8a formed on the spool and has a reduced diameter portion at its upper portion thereof. A spring 45 is wound around said reduced diameter portion and an end 45a of said spring is fitted in the recess 43b of the gear 43. Thus the power is transmitted from the gear 43 to the gear 44 through the frictional force produced by the spring 45.

Rewinding gears 46–49 are arranged to rewind the film into the film cartridge. The gear 46 is disposed at a position where it is engageable with the above-mentioned planet gear 41, and the gear 49 is in meshing engagement& with a fork gear 50, whereby it is possible to transmit a driving force to a fork 51 through the fork gear 50. The fork 51 and the fork gear 50 are connected together through a key-keyway connection (not shown), so that the rotation can be transmitted from the gear to the fork even if the fork 51 is moved in an upward or downward direction relative to the fork gear. In FIG. 4 the fork is arranged to be retracted in an upward direction as indicated by an arrow by a closure opening signal and to be projected into the film cartridge chamber by a closure closing signal.

A timing belt 52 is arranged between the pulley 2b fixed at the upper end of the feeding roller 2 and the pulley 42a of the intermediate gear 42 to transmit a driving power to the feeding roller 2. The sprocket 30 is rotatably supported on the camera body 1 and a pulse plate 53 is fixed above the sprocket 30.

The pulse plate 53 has a conductive pattern 53a. A feeding switch 54 has two independent contact pieces 54a and 54b which are arranged to make slidable contact with the conductive pattern 53a formed on the surface of said pulse plate 53. Thus, the feeding switch 54 can detect the feeding rate of the film as the sprocket 30 is rotated by the movement of the film.

FIG. 6 is a block diagram showing a control circuit mounted in the camera to control the operation thereof. In FIG. 6, the numeral 5 indicates the switch as shown in FIG. 3, and the numeral 9 indicates the motor as shown in FIGS. 3 and 4.

The control circuit as shown in FIG. 6 includes a switch 59 which is arranged to be turned off in response to the closing of the closure 19, a switch 66 which is arranged to be turned on in response to the push operation of the release button 57 (FIG. 2), an exposure control circuit 67 which serves to control a light measuring device, a shutter and a diaphragm mechanism, a stretched state detecting circuit 68 which serves to detect the state where the film is stretched between the film cartridge and the spool at the final stage of the winding operation of the film, a rewinding control circuit 69, a winding control circuit 70, a motor drive circuit 71 for controlling the motor 9, and inverters 72 and 73. The numeral 54 indicates the film feeding switch, as mentioned above, which is arranged to detect the film feeding rate.

Now, the description will be given to the film loading and photographing operation and the functions of the several parts of the camera during operation, with reference to FIGS. 1-6.

At the time of loading the film into the camera, the user firstly opens the closure 19, as shown in FIG. 1, inserts the film cartridge into the film cartridge chamber 1a, and then closes the closure. At this stage the leader portion of the film F extends, through the film entrance 18 formed between the rear cover 15 and the closure 19, to the outside of the camera, as shown in FIGS. 2 and 3.

When the closure 19 is closed the hook portion 28a of the closure opening and closing lever 28 comes into engagement with the locking pin 60, so that the closure 19 is locked. In response to the closing of the closure 19, the switch 59 is opened and a signal produced by the opening operation of the switch 59 is applied to the rewinding control circuit 69. On the other hand, the leader portion of the film F presses one of the contact pieces of the switch 5, thereby turning off the switch 5 and a signal produced by the turning off of the switch 5 is fed to the rewinding control circuit 69. When these two signals are fed into the rewinding control circuit 69, a control signal output of the rewinding control circuit 69 is applied to the motor drive circuit 71 to rotate the motor 9 in reverse direction (that is, in the direction to rewind the film into the film cartridge). The motor drive circuit 71 feeds a current to the armature of the motor 9 to rotate the motor in the reverse direction, and thus the motor 9 is rotated in the film rewinding direction.

When the motor 9 starts its rotation in the film rewinding direction, the sun gear 38 (FIG. 4) is rotated in clockwise direction, as viewed in FIG. 4, through the gear train 34–37 by the motor, so that the planet lever 39 is rotated in clockwise direction around the shaft 40, until the planet gear 41 comes into meshing engagement with the gear 46. When the planet gear 41 comes into engagement with the gear 46, the planet gear 41 starts its rotation because the load torque applied to the gear 46 is higher than the frictional torque existing between the planet lever 39 and the planet gear 41. Thus the driving force of the motor 9 is transmitted through the sun gear 38 and the planet gear 41 to the gear 46, and, consequently, the fork gear 50 is rotated through the gear train 46–49. Since the fork 51 has a threaded engagement with the fork gear 50, the rotation of the fork gear 50 produces axial movement of the fork 51 in downward direction, until the fork 51 enters into a central hole of the film cartridge P and then the fork 51 is rotated to rewind the film into the film cartridge.

Thus the leader portion of the film F exposed outside the camera as shown in FIG. 3, is retracted into the camera, and when the end of the leader portion of the film F comes out of contact with the contact piece of the switch 5 and comes to the position of the roller 24, the switch 5 is turned on, so that a signal is fed to the rewinding control circuit 69 and said signal is also fed through the inverter 72 to the winding control circuit 70. Accordingly, the control signal output of the film rewinding control circuit 69 fed to the motor drive circuit to rotate the motor 9 in reverse direction is stopped, while a control signal to rotate the motor 9 in forward direction (that is, the direction to wind up the film onto the spool 8) is applied to the motor drive circuit 71. Thus, the motor drive circuit serves to feed a current to the armature of the motor 9 to rotate said motor in the film winding direction.

Thus the motor 9 starts its rotation in forward direction and the sun gear 38 is rotated in counterclockwise direction, as viewed in FIG. 4, through the gear train 34–37. Accordingly, the planet lever 39 is rotated in counterclockwise direction around the shaft 40 and the planet gear 41 is revolved in counterclockwise direction around the shaft 40. As the result, the planet gear 41 comes out of engagement with the gear 46 and then comes into engagement with the gear 42. Then, the planet gear 41 is rotated in clockwise direction by the sun gear 38 and the gear 42 is rotated in counterclockwise direction by the planet gear 41. As the gear 42 is rotated, the pulley 42a integrally fixed to the gear 42 is also rotated in counterclockwise direction, so that the pulley 2b is also rotated in counterclockwise direction through the belt 52. Consequently, the feeding roller 2 integrally fixed to the pulley 2b is rotated in counterclockwise direction, as viewed in FIG. 4, and in clockwise direction, as viewed in FIG. 3. Thus, the film is fed from left to right, in FIG. 3.

Since the gear 42 is rotated in counterclockwise direction in FIG. 4, the gear 43 is rotated in clockwise direction and the rotation of the gear 43 is transmitted through the spring 45 to the gear 44, which is rotated in clockwise direction. Accordingly, the spool 8, which is integrally formed with the spool gear 8a, is rotated in counterclockwise direction in FIG. 4 (that is in clockwise direction in FIG. 3).

When the feed roller 2 is rotated in clockwise direction in FIG. 3, the film starts its movement from left to right and &he feed roller 23 on the closure is rotated by the film in counterclockwise direction. A the time immediately before the motor 9 starts its rotation in forward direction, the end of the leader portion of the film is positioned near the roller 24. Accordingly, when the feed roller 2 starts its rotation in clockwise direction in FIG. 3, the end of the film is immediately fed into a gap between the pressing plate 16 and the aperture glass plate 7 and, thereafter, the film is fed through the aperture face along the aperture glass plate 7. When the end of the film comes to the central position of the aperture, the teeth of the sprocket 30 come into engagement with perforations of the film and, thereafter, the sprocket 30 is rotated in response to the movement of the film.

When the end of the leader portion of the film enters the spool chamber 1b, the film is pressed by the roller 14 against the outside peripheral surface of the spool 8 and further pressed by the roller 12 against the outside peripheral surface of the spool 8.

The film winding speed of the spool 8 is set at a higher speed than the film feeding speed of the feed roller 2, so that the film is wound up onto the spool, without causing a slack of the film. The difference in speed between the winding speed and the feeding speed is absorbed by slipping caused at the portion of the spring 45.

As the sprocket 30 is rotated by the film, the pulse plate 53 is rotated, so that the switch 54 including the contact pieces 54a and 54b making contact with the conductive pattern 53a formed on the pulse plate 53 produces repeated on-off operation, whereby the switch 54 generates pulse signals corresponding to the movement of the perforations of the film. These pulse signals are fed into the winding control circuit 70 and counted by a counter in said circuit 70. Thus the film feeding amount (in this case, the amount of idle winding) is detected and stored.

When the winding of the forward end portion of the film onto the spool 8 (in this case, the idle winding) reaches a predetermined amount, the winding control circuit 70 sends a control signal to the motor drive circuit 71 to stop the same, and the motor drive circuit 70 stops feeding of current to the motor 9, in response to the control signal as mentioned above, thereby stopping the motor 9. Accordingly, the camera is set in its wait state under such condition that the predetermined length of the forward end portion of the film has been wound up onto the spool. At this stage, the planet gear 41 is in such state that it is in meshing engagement with the gear 42 as shown in FIG. 4.

At the time of photographing, when the user pushes the release button 57 of the camera, the switch 66 in FIG. 6 is opened and the exposure control circuit 67 operates, whereby &he light measurement and the exposure (photographing) are effected by the light measuring device, the shutter control mechanism and the like which are well known per se in the art. When the exposure has been completed, a signal indicating that the exposure has been completed is sent from the exposure control circuit 67 to the winding control circuit 70. When the winding control circuit 70 receives said signal, a "one frame winding signal" is applied to the motor drive circuit 71 to cause the motor 9 to be rotated to the amount corresponding to "one frame feeding" of the film. Accordingly, the motor drive circuit 71 sends a current to the motor 9 to cause the rotation of the motor to the amount required to feed the film by one frame. Thus the motor 9 makes rotation to the amount corresponding to the amount of feeding the film by one frame and then immediately stops. In this case, the transmission of driving force from the motor 9 to the spool 8 and the feed roller 2 is effected in such state as shown in FIG. 4. The amount of feeding the film is detected in the form of pulses which are produced by connecting and disconnecting of the contact pieces of the switch 54 and the conductive pattern 53a. The pulses as mentioned above are counted by means of the counter disposed in the winding control circuit 70. The winding control circuit 70 causes the motor drive circuit 71 to stop rotation of the motor 9 at every moment when the pulses fed from the switch 54 reaches a predetermined number.

As explained above, the above construction operates in such manner that at every time the shutter release is operated the film is wound up onto the spool 8 to the amount corresponding to one frame of the film. When all of the frames of the film have been drawn out of the film cartridge and subjected to the exposure the film is in a stretched state between the film cartridge P and the spool 8. The stretched state is detected by the stretched-state detecting circuit 68, which produces a stretched-state detecting signal. The stretched-state detecting signal thus produced is fed to the rewinding control circuit 69 and also it is fed through the inverter 73 to the winding control circuit 70. Accordingly, the output control signal of the winding control circuit& 70 fed to the motor drive circuit 71 to rotate the motor 9 in the forward direction is stopped, while a control signal output of the rewinding control circuit 69 is fed to the motor drive circuit 71, thereby causing the motor drive circuit 71 to rotate the motor 9 in the reverse direction.

When the motor 9 is rotated in the reverse direction, the planet gear 41 comes into meshing engagement with the gear 46, in the same manner as explained above, and then the rotation of the motor 9 is transmitted through the gear train 46–49 to the fork gear 50, so that the fork 51 enters the film cartridge P, thereby rewinding the film into the film cartridge.

Figure 17:
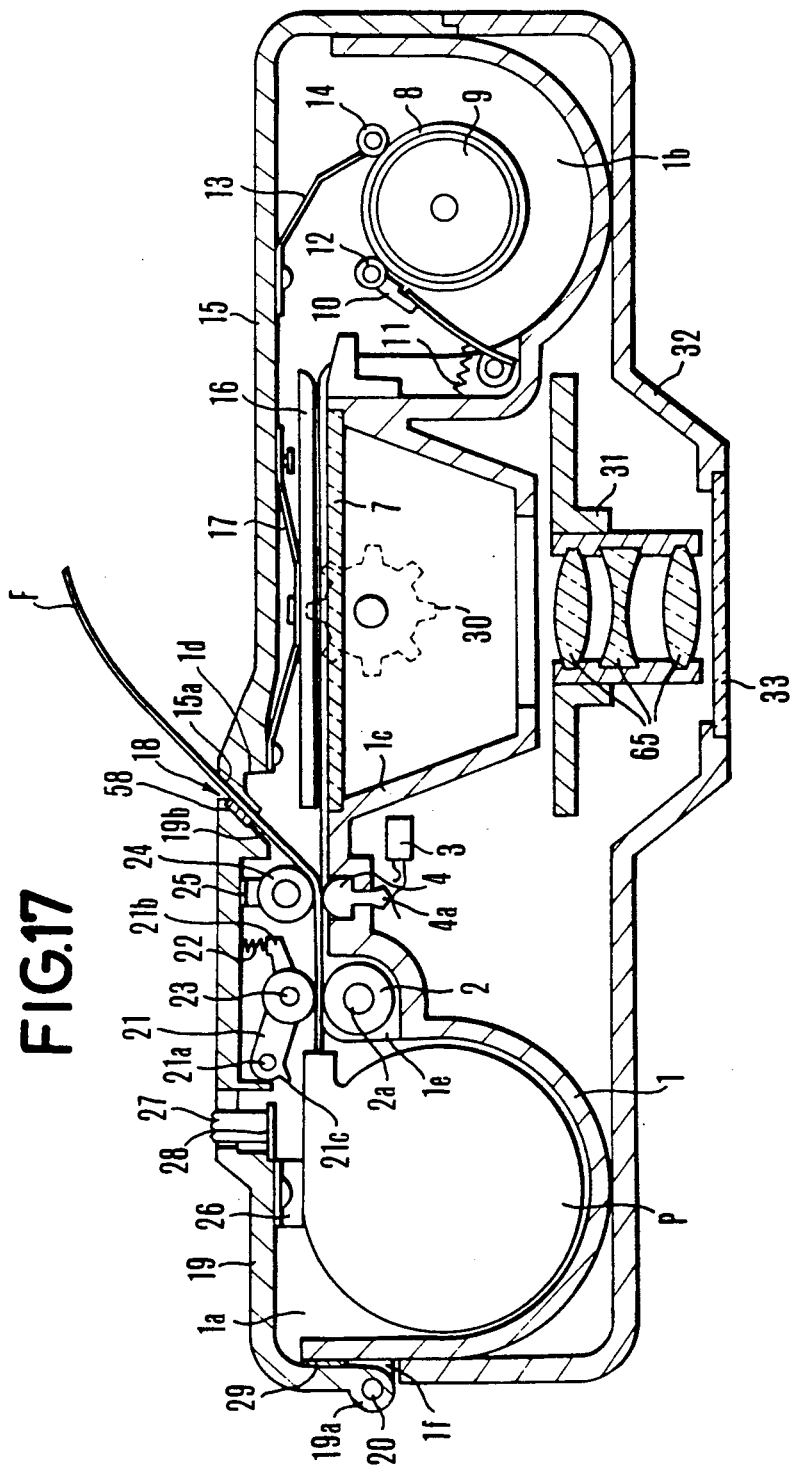
FIG. 17 is a sectional view of the camera taken along a horizontal plane, showing a partly modified form of the camera shown in FIG. 3.

FIG. 17 illustrates a partly modified form of the above-described embodiment. In FIG. 17, the same parts as those shown in FIG. 3 are indicated by the same symbols as used in FIG. 3 and the detailed explanation of these parts is omitted.

The modified form as shown in FIG. 17 is characterized by the provision of a film responsive button 4 having a semi-spherical head, arranged in opposite relation to the second guide roller 24, in place of the switch 5 for detecting existence or non-existence of the film as shown in FIG. 3. A switch 3 is arranged to be opened or closed by a tail portion 4a of said film responsive button 4. That is, in the modified form as shown in FIG. 17, the switch for detecting existence or non-existence of the film is arranged in the posit-on opposite to the second guide roller 24. According to this form, the switch 3 for detecting existence or non-existence of the film is not exposed when the closure 19 is opened and consequently, there is no possibility of the switch 3 being damaged, so that maneuverability and durability of the camera are further improved.

Now, the second embodiment of the present invention will be explained, with reference to FIGS. 7(A) and 7(B). The essential parts of the camera according to the second embodiment are same as those shown in the first embodiment as explained above, and, therefore, in the following explanation, the description will be given to the parts which are different from those shown in the first embodiment. The other parts are the same as described with reference to the first embodiment and are indicated by the same symbols as used in the explanation of the first embodiment.

Figure 7A:
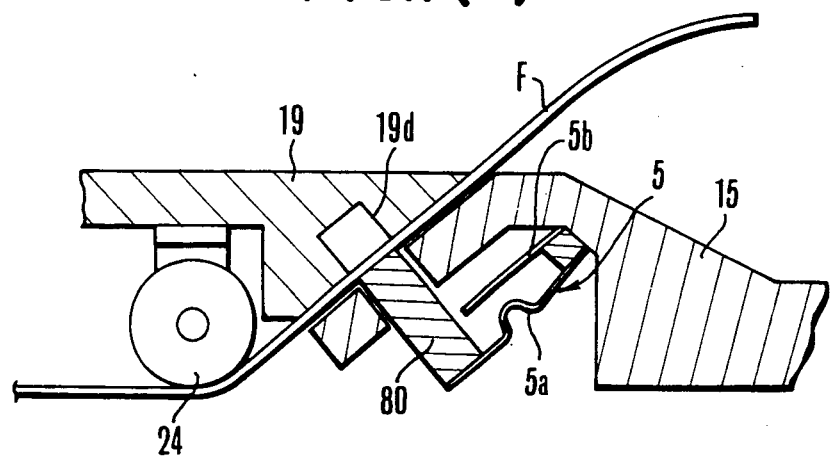
Figure 7B:
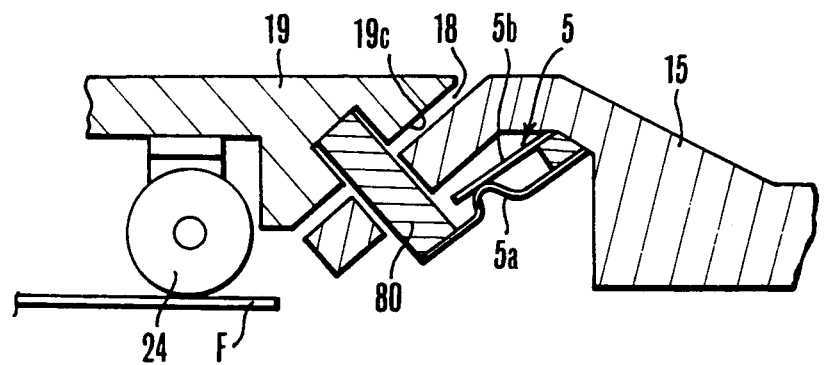

The embodiment as shown in FIGS. 7(A) and 7(B) includes a movable light shielding member 80 which is movable in a direction at a right angle to the film entrance 18. In the embodiment as shown in FIGS. 7(A) and 7(B), said movable light shielding member is mounted in the rear cover 15 and energized toward an abutment surface 19c of the closure 19 by a suitable energizing means. In the case of this embodiment, the energizing means as mentioned above is constituted by one of the contact pieces 5a of the film detecting switch 5 and said movable light shielding member 80 is fixedly supported by said contact piece 5a. The contact piece 5a produces a force to urge itself toward the other contact piece 5b, which is located nearer to the film entrance 18, under the action of the strong elastic force of itself, thereby energizing said movable light shielding member 80 in the direction at right angle to the film entrance 18. On the other hand, the abutment surface 19c of the closure 19, which forms the film entrance 18, is formed with a recess 19d at a position in opposite relation to the forward end of said movable light shielding member 80, which allows entering of said movable light shielding member. When the film F exists in &he film entrance 18 the forward end of the movable light shielding member 80 is pushed by the film F into the rear cover 15 that is, outwardly of the opening formed in the rear cover 15), as shown in FIG. 7(A), so that the movable light shielding member 80 is prevented from entering the recess 19. On the other hand, when the forward portion of the film F (that is, the leader portion of the film) has been retracted into the camera, the movable light shielding member 80 is pressed into the recess 19d across the film entrance 18, under the action of the resilient force of the contact piece 5a. In this manner, the light through the film entrance is shielded by said member, while the contact pieces 5a and 5b of the film detecting switch 5 come into contact with each other.

In the improved camera according to the second embodiment of the present invention, as described above, there is no danger of causing leakage of light through the film entrance 18 even if the movable light shielding member is worn away, and, consequently, the performance at the initial state of the camera can be maintained for a long period.

Although the means for energizing the movable light shielding member 80 has been described as the one utilizing the contact piece 5a of the film detecting switch 5 in the above explanation of the embodiment, it is a matter of course that the film detecting switch may not be utilized as the movable light shielding member. Although the movable light shielding member 80 has been described as the one disposed in the rear side 15, it may be, of course, be disposed in the closure 19.

Figure 9:
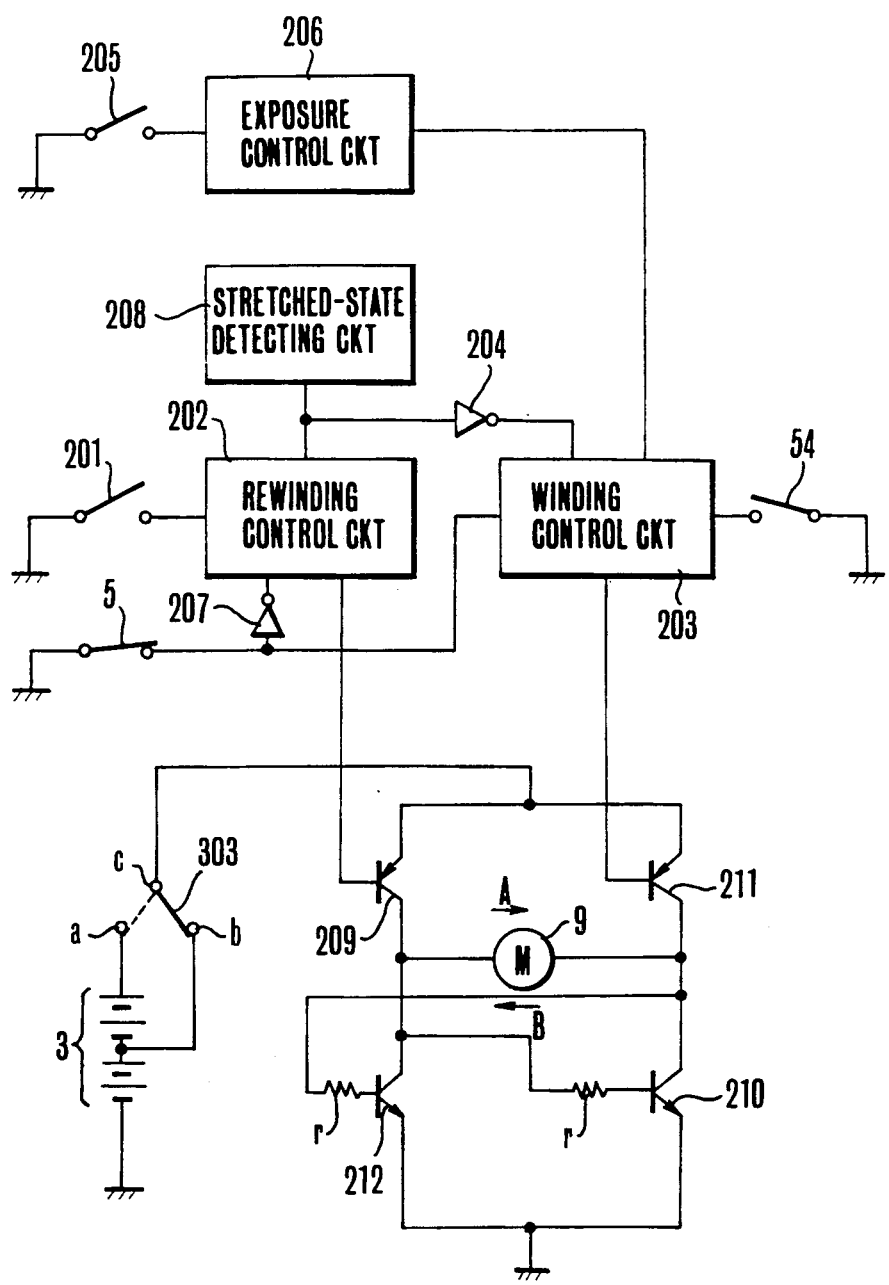
FIGS. 8 and 9 illustrate a construction of a control part according to a third embodiment of the present invention.
Figure 8:
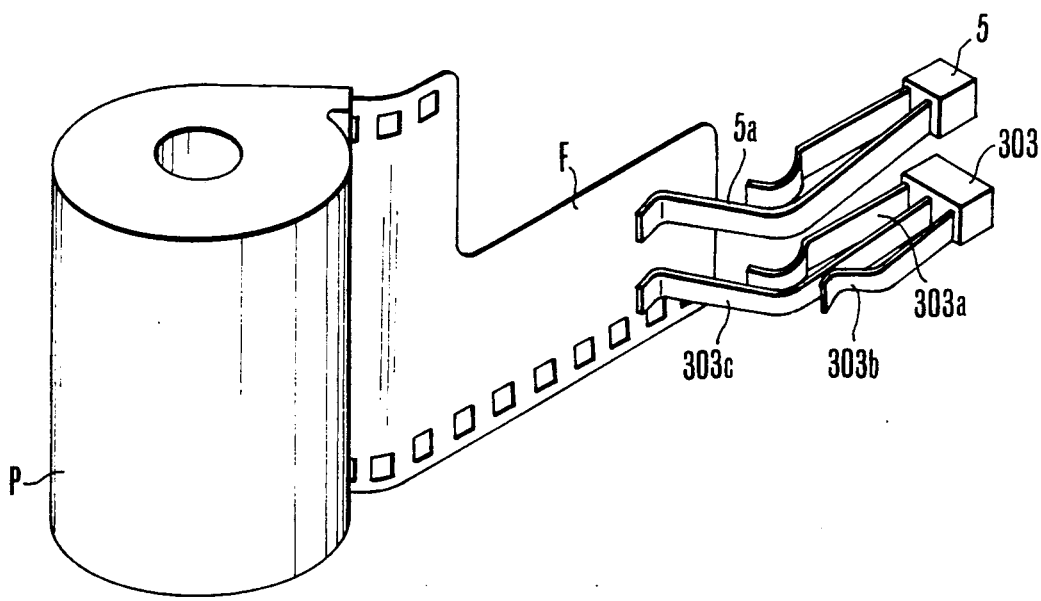

Now, the third embodiment of the present invention will be described. The third embodiment includes the same constructions as those explained with reference to the first embodiment. FIGS. 8 and 9 illustrate the control arrangement according to this embodiment. In FIG. 8, the film detecting switch 5 as shown in FIG. 3 is included and this film detecting switch for detecting the existence or non-existence of the film is fixed on the rear cover 15 (as shown in FIG. 3). One contact piece 5a of the pair of contact pieces of the switch 5 is arranged to come into contact with the leader portion of the film F and it is pushed away from the other contact piece by the leader portion of the film F when said leader portion exists in the film entrance 18 as shown in FIG. 3. When said contact piece 5a is held away from the other contact piece by the leader portion of the film F, as described above, said switch 5 is &turned off and when said contact piece 5a comes into contact& with the other contact piece (that& is, when the leader portion of the film F does not exist in the film entrance 18), the switch 5 is turned on. A rewinding-mode discriminating switch 303, which is not shown in FIG. 3, is fixed on the rear cover 15 and it is disposed in the film entrance 18 in juxtaposed relation to the film detecting switch 5 on the rear cover 15. The rewinding-mode discriminating switch 303 is a double throw switch which has a long contact piece 303c arranged to come into contact with the leader portion of the film and two short contact pieces 303a and 303b which are disposed on opposite sides of the contact piece 303c. When the contact piece 303c is in contact with the leader portion of the film F the contact piece 303c and the contact piece 303b contact with each other, while the contact piece 303c and the contact piece 303a do not contact with each other.

FIG. 9 is a block diagram showing the control circuit including rewinding speed control means associated with the film detecting switch 5 and the rewinding-mode discriminating switch 303, according to the embodiment of the present invention.

The circuit as shown in FIG. 9 includes a closure responsive switch 201 which is arranged to be closed in response to closing of the closure 19, a rewinding control circuit 202 which is arranged to control the motor 9 at the time of rewinding the film, a winding control circuit 203 which is arranged to control the motor 9 at the time of winding the film, an inverter 204 for inverting polarity of a signal, a switch 205 which is arranged to be closed when the release but&on 57 is pushed to effect the photographing operation, an exposure control circuit 206 which is arranged to effect light measuring and diaphragm controlling operation and shutter controlling operation in response to turning on of the switch 205, an inverter 207, a stretched-state detecting circuit 208 which is arranged to detect a stretched state where the frames of the film which can be photographed have been wholly fed out of the film cartridge and the film becomes held in stretched state between the film cartridge and the spool, transistors 209-212 constituting a transistor bridge circuit for controlling current fed to the motor 9 and a resistor r connected to bases of the transistors 210 and 212. The switch 54 as shown in FIG. 6 which is arranged to produce pulse signals corresponding to the film feeding amount in response to the rotation of the sprocket 30 as shown in FIGS. 3 and 4 is included in the circuit. The rewinding control circuit 202 applies an "L" level voltage when the switch 201 is closed and the output of the inverter 207 is a& "L" level. The winding control circuit 203 includes memory means, such as counter, and it functions to store the member of pulses produced by the on-off operation of the switch 54.

The rewinding-mode discriminating switch 303 is connected between the power source 3 and the transistor bridge circuit consisting of the transistors 209-212, and it is so arranged that when the contact piece 303c comes into contact with the contact piece 303b the contacts c and b are connected with each other and when the contact piece 303c comes into contact with the contact piece 303a the contacts c and a are connected with each other.

The power source 3 has a tap at its ½ voltage position, and one of the contacts b is connected with said tap, while the other contact c is connected to the full voltage terminal of said power source 3.

Now, the operation of the camera according to the above-mentioned embodiment will be described, with reference to FIGS. 1-5 and FIGS. 8 and 9.

At the time of loading the film into the camera, the closure 19 is opened as shown in FIG. 1 and the film cartridge is inserted into the film cartridge chamber. The closure 19 is closed, while the leader portion of the film F extending out of the film cartridge is held exposed outside the camera, as shown in FIGS. 2 and 3.

When the closure 19 is closed, the closure responsive switch 201 is turned on in FIG. 9 and the hook portion 28a (FIG. 5) comes into engagement with the locking pin 60, so that the closure becomes locked. The film detecting switch 5 is turned off, since the film exists in the film entrance 18.

On the other hand, the contact piece 303c of the rewinding mode discriminating switch 303 is pushed by the film to the front side, as viewed in FIG. 8, so that the contact piece 303c of said switch comes into contact with the contact piece 303b and, consequently, the contacts b and c of the switch 303, as shown in FIG. 9, are connected with each other. Thus, the ½ voltage of the power source 3 is applied to the transistor bridge circuit.

When the closure responsive switch 201 is turned on and the film detecting switch 5 is turned off, a first input signal is applied through the inverter 207 to the rewinding control circuit 202 and a second signal input is directly applied from the switch 201 to said rewinding control circuit, so that the rewinding control circuit 202 produces an "L" level output at its output terminal connected to the base of the transistor 209. Accordingly the transistor 209 is turned on. The base potential of the transistor 210, which is connected through the resistor r to the collector of said transistor 209, is increased, so that the transistor 210 is also turned on and a current passes through the motor M in the direction as indicated by an arrow A, whereby the motor 9 is rotated in the film rewinding direction. In this stage, the ½ voltage of the power source 3 is applied to the motor 9 through the rewinding-mode discriminating switch 303 and, therefore, the motor 9 rotates at a speed slower than that of the usual rewinding speed.

Referring to FIG. 4, when the motor is rotated in the reverse direction (in the film rewinding direction), the rotation of the pinion gear 34 is transmitted through the reduction gear train 35-37 to the sun gear 38, thereby rotating the sun gear 38 in clockwise direction. Accordingly, the planet lever 39 and the planet gear 41 are rotated as a unit in clockwise direction. Therefore, the rotation of the motor is transmitted through the rewinding gear train 46-49 and the fork gear 50 to the fork 51. When the closure is closed, the fork 51 projects into the film cartridge chamber 1a and engages with the film cartridge P and, therefore, the leader portion of the film F is rewound into the film cartridge. At this state, the planet gear 41 is disengaged from the intermediate gear 41, so that the spool 3 and the feed roll are free from the motor.

In this case, the rotating speed of the motor 9 is considerably lower than the usual rewinding speed and, therefore, the leader portion of the film F moves at a substantially low speed from the outside of the camera into the inside of the closure 19, with the result that the user can carefully watch the process of loading cf the film into the camera.

As the end of the leader portion of the film moves into the camera and reaches the position of the second guide roller 24, the leader portion of the film F comes out of contact with the contact piece 5a of the film detecting switch. Accordingly, the switch 5 in FIG. 9 is closed, and the contact piece 303c comes into contact with the contact piece 303a and out of contact with the contact piece 303b, since the force of the leader portion of the film F pressing the contact piece 303c of the rewinding-mode discriminating switch 303 is decreased. As the result, the full voltage of the power source 3 is applied to the transistor bridge circuit. At this stage, the output level of the inverter 207 changes from "L" to "H" in response to the closing of the switch 5 and the input signal to operate the rewinding control circuit 202 disappears. Accordingly, the voltage level applied from the rewinding control circuit 202 to the base of the transistor 209 becomes "H" level, so that the transistor 209 is turned off, with the result that the transistor 201 is also turned off and the current applied to the motor 9 is cut off, whereby the motor 9 is stopped.

On the other hand, the winding control circuit 203 starts its operation in response to the closing of the switch 5. When the winding control circuit 203 starts its operation, the voltage level applied from said circuit 203 to the base of the transistor 211 changes from "H" to "L", with the result that the transistor 211 is turned on and produces a collector current. Thus the transistor 212 having a base connected to the collector of the transistor 211 is turned on so that a current passes through the motor 9 in the direction as indicated by B, from the transistor 211 to the transistor 212. Accordingly, the motor 9 starts its rotation in the film winding direction. At this stage the switch 303 is in such state a that the contacts a and c are connected with each other, as explained above, so that the full voltage of the power source 3 is fed to the motor 9, which is rotated in the forward direction at the usual winding speed. The rotation of the motor is transmitted through the gear train 34–37, as shown in FIG. 4, to the sun gear 38.

The sun gear 38 is rotated in counterclockwise direction and, consequently, the planet lever 38 is rotated in counterclockwise direction. The planet gear 41 comes into meshing engagement with the intermediate gear 42, which is rotated in counterclockwise direction, as viewed in FIG. 4. Accordingly, the gear 43 is rotated in clockwise direction and the gear 44 is rotated also in clockwise direction. Thus the spool 8 is rotated in counterclockwise direction, that is, film winding direction.

The pulley 42a, which is disposed at the top of the intermediate gear 42, is rotated in counterclockwise direction, and the rotation of said pulley is transmitted through the timing belt 52 to the pulley 2b, which is rotated in counterclockwise direction. The feed roller 2, which is integrally connected with the pulley 2b, cooperates with the first guide roller 23 to feed the leader portion of the film toward the spool chamber. Since the aperture surface is covered by the glass plate 7, the film passes through the gap formed between the pressing plate and the glass plate 7. At this stage the perforations of the leader portion of the film F automatically come into engagement with the sprocket 30. When the leader portion of the film F enters the spool chamber 1b, it is guided by the rollers 14 and 12 and wound up onto the spool 8.

The film winding speed of the spool 8 is set at a faster speed than the film feeding speed of the feed roller 2 and, consequently, the film is wound up onto the spool, without causing any slack in the spool chamber and the difference between the winding speed and the feeding speed is absorbed by slippage of the spring 45 produced between the gear 43 and the gear 44.

When the film is wound up as described above, the amount of movement of the film is detected in the form of the number of pulse signals produced by the feed switch 54 which makes contact with the pulse plate 53 rotated by the sprocket 30, and said pulse signals are fed to the winding control circuit 203. The winding control circuit 203 functions to change the voltage level applied to the base of the transistor 211 from "L" to "H", at the time when a predetermined number of the above-mentioned pulse signals have been counted and the leader portion of the film has been completely wound up onto the spool 8. The transistor 211 is turned off and the transistor 212 is turned off. As the result, the current passing through the motor 9 in the direction as indicated by the arrow B is cut off, so that the motor 9 is stopped. At the same time, an indication of "Ready for photographing" is displayed on a display device (not shown).

The photographing is effected by pushing the release button 57. When the release button 57 is pushed, the switch 205 (FIG. 9) is closed, so that the exposure control circuit 206 functions to effect the photographing operation by the light measuring device, the shutter mechanism and the like (not shown). When the photographing has been completed (that is the exposure operation has been completed), a signal indicating that the exposure has been completed is fed from the exposure control circuit 206 into the winding control circuit 203, and in response to this input signal said winding control circuit 203 produces a signal to lower the base potential of the transistor 211. The transistors 211 and 212 are operated into conductive states by the signal fed from the winding control circuit 203, in the same manner as described above, so that the current passes through the motor 9 in the direction as indicated by B and said motor 9 is rotated to the amount corresponding to the winding of one frame of the film. (At the time of rotation of the motor, the number of pulses produced by the on-off operation of the feed switch 54 is counted by the counter arranged in the winding control circuit 203 and when a predetermined number of the pulses has been counted the signal level applied from the winding control circuit 203 to the base of the transistor 211 is changed from "L" to "H".) After the forward end of the leader portion of the film has been wound onto the spool 8, the planet gear 41 of the film feeding mechanism is held in meshing engagement with the intermediate gear 42, as shown in FIG. 4. Accordingly, when the motor 9 is rotated in the forward direction (that is, when the current is fed in the direction indicated by the arrow B in FIG. 9), the spool 8 is rotated, in the state as shown in FIG. 4, to effect the winding of the film. (The description concerning the operation of the film feeding mechanism is omitted.)

At every time when one frame of the film has been photographed, the above-mentioned operation is repeated. When the whole number of frames which can be photographed have been drawn out of the film cartridge, the film becomes stretched between the film cartridge and the spool. When such stretched state of the film is detected by the stretched-state detecting circuit 208, the voltage level applied from the rewinding control circuit 202 to the base of the transistor 209 is charged from "H" to "L", so that the transistor 209 is made conductive and the transistor 210 is made conductive, whereby the current is fed to the motor 9 in the direction as indicated by the arrow A and thus the motor starts its rotation in the film rewinding direction. Accordingly, the sun gear 38 is rotated in the clockwise direction in FIG. 4, so that the planet lever 39 is rotated in clockwise direction around the shaft 40, thereby causing the planet gear 41 to be moved away from engagement with the intermediate gear 42 and into meshing engagement with the gear 46. Thus, the rotation of the motor 9 is transmitted through the gear train 46–49 to the fork gear 50, and after the fork 51 has been projected into the film cartridge P the rewinding of the film is started. When the rewinding of the whole length of the film has been completed, the voltage level applied from the rewinding control circuit 202 to the base of the transistor 209 is changed from "L" to "H". Accordingly, the transistors 209 and 210 are turned off and the motor 9 is stopped.

Now, a modified form of the above-mentioned third embodiment cf the present invention will be described, with reference to FIGS. 10 and 11.

Figure 10:
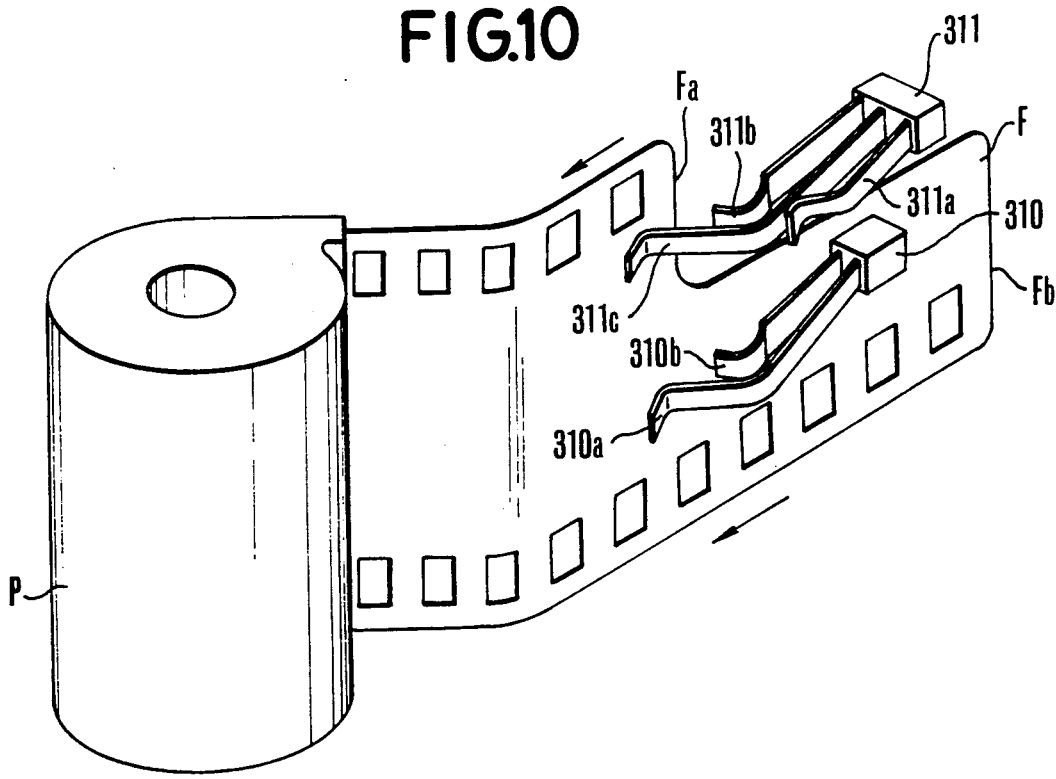
FIGS. 10 and 11 illustrate a modified construction of the control part according to the third embodiment of the present invention.
Figure 11:
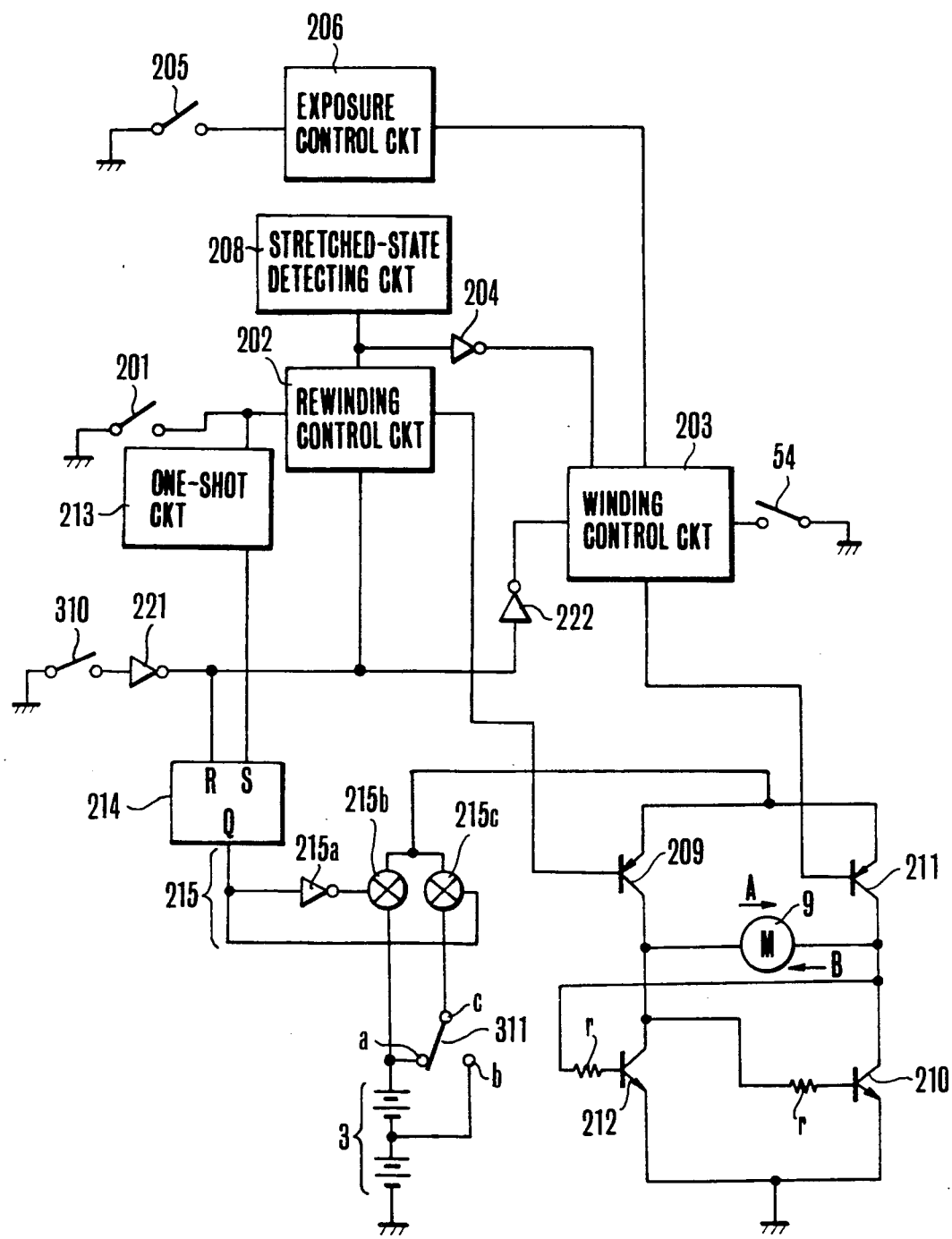

The modified form as shown in FIGS. 10 and 11 is different from the above-described third embodiment in such point that the idle rewinding of the leader portion of the film F is effected at the usual rewinding speed during the initial period of the idle rewinding operation and at a reduced speed during the latter period of said operation, and then a motor stop signal is produced. In the modified form as shown in FIGS. 10 and 11, the parts which are common to those shown in the above-described embodiment are designated by the same symbols and the detailed descriptions of these parts are omitted.

As shown in FIG. 10, this modified form includes a switch 311 which is arranged to detect passage of an edge Fa of a cut portion formed in the leader portion of the film F and a switch 310 which is arranged to detect passage of an edge Fb of a lower portion of said leader portion of the film F. The switch 311 functions to reduce the rotating speed of the motor 9 (that is, to reduce the voltage applied to the motor) after it has detected the passage of the upper edge Fa of the leader portion of the film F, and the switch 310 functions to stop the motor 9 at the time when it has detected the passage of the lower edge Fb of the leader portion of the film F.

The switch 310 includes two contact pieces 310a and 310b and it is turned off when the leader portion of the film F exists in the film entrance 18 and the contact piece 310a is pressed by said leader portion. The switch 311 is a double throw switch which includes a long contact piece 311c arranged to contact with the leader portion of the film and two short contact pieces 311a and 311b disposed at opposite sides of said contact piece 311c. Said switch 311 is arranged to cause the contact piece 311c to contact with the contact piece 311a, thereby forming a connection with the full voltage terminal of the power source, when the upper edge Fa of the leader portion of the film F exists in the film entrance 18 and the contact piece 311c is pressed thereby. When the upper edge Fa of the leader portion of the film moves out of contact with the contact piece 311c, said contact piece 311c moves away from the contact piece 311a and comes into contact with the contact piece 311b, thereby forming connection with the center tap of the power source.

FIG. 11 is a block diagram showing means for controlling the rewinding speed of the leader portion of the film, including the above-mentioned switches 310 and 311, and control circuits associated therewith. In FIG. 11, same parts as those shown in FIG. 9 are designated by the same symbols as used in FIG. 9.

The circuit as shown in FIG. 11 includes a one-shot circuit 213 which is arranged to produce a one-shot pulse in response to the closing of the closure switch 201, a RS flip-flop 214 (hereinafter referred to as "FF"), and a selector 215 consisting of multiplexer or two analog switches. In the embodiment as shown in FIG. 11, the selector 215 is constituted of two analog switches 215b and 215c and an inverter 215a. One analog switch 215b is connected with the full-voltage output terminal and the other analog switch 215c is arranged to be connected with either of the full-voltage output terminal or the center tap. Each of the analog switches 215b and 215c is turned on and off under the action of the Q terminal output of the FF 214. The switch 311 is so arranged that when the contact piece 311c and the contact piece 311a make contact with each other the contact c and the contact a (FIG. 11) are connected together, whereby the analog switch 215c is connected to the full-voltage terminal of the power source 3, and when the contact piece 311c and the contact piece 311b make contact with each other the contact c and the contact b are connected together, whereby the analog switch 215c is connected to the center tap of the power source 3. The circuit as shown in FIG. 11 includes inverters 221 and 222.

Now, the operation of the respective parts of the camera and the circuit will be described, with reference to FIGS. 10 and 11 and FIGS. 3 and 4. The function of the film feeding mechanism at the time of the film rewinding and film winding operation is substantially the same as explained above with reference FIGS. 8 and 9 and, therefore, the detailed description of the film feeding mechanism is omitted.

In operation, the film cartridge is inserted into the cartridge chamber 1a and then the closure 19 is closed, while the leader portion of the film extending outside the film cartridge is held exposed outside the camera, as shown in FIG. 3. The closure responsive switch 201 is closed, in FIG. 11, and the contact piece 311c of the switch 311 is caused to make contact with the contact piece 311a under the action of the upper edge Fa of the leader portion of the film F, as shown in FIG. 10. Accordingly, the switch 311 is brought into the state where the contact c is connected to the contact a which is connected with the full-voltage terminal of the power source 3, as shown in FIG. 11. On the other hand, the contact piece 310a is moved away from the contact piece 310a, as shown in FIG. 10, so that the switch 310 in FIG. 11 is moved to its open state.

When the closure responsive switch 201 is closed, a signal is fed to the one-shot circuit 213 to operate the same. When the signal is fed to the one-shot circuit 213 from the closure responsive switch 201, a one-shot pulse produced by the one-shot circuit 213 is fed to a set input terminal of the FF 214 as a setting pulse and thus the FF 214 becomes its set state, so that the output level at the Q output terminal becomes "H", with the result that the analog switch 215b is made non-conductive and the analog switch 215c is made conductive.

Accordingly, the full-voltage of the power source 3 is applied to the transistor bridge through the analog switch 215c and the contacts c and a.

On the other hand, the signal is also fed to the rewinding control circuit 202, when the closure responsive switch 201 is closed. The switch 310 is held open and the output level of the inverter 221 is "L". Accordingly, the rewinding control circuit 202 is operated and an "L" level voltage is applied from the rewinding control circuit 202 to the base of the transistor 209. Thus the transistor 209 is turned on and a current is fed to the motor 9 in the direction as indicated by the arrow A, so that the motor 9 starts its rotation in the film rewinding direction. In this case, the full-voltage of the power source 3 is applied through the analog switch 215c and the contacts c and a to the transistor bridge and, therefore, the motor 9 rotates at the usual rewinding speed (that is, higher speed), with the result that the leader portion of the film exposed outside the camera is retracted into the camera at the high speed.

When the leader portion of the film F has been retracted into the camera and the edge Fa of the cut portion of the leader portion of the film has moved out of contact with the contact piece 311c of the switch 311, the contact piece 311c is moved out of contact with the contact piece 311a and into contact with the contact piece 311b. Accordingly, the contact c of the switch 311 is connected with the contact b, in FIG. 11, so that ½ of the full voltage of the power source 3 is applied to the motor 9.

Thus, during the process of rewinding the leader portion of the film the leader portion of the film is rewound at a lower speed after the edge Fa of the leader portion of the film has moved out of contact with the contact piece 311c of the switch 311. When the edge Fb of the leader portion of the film F moves out of contact with the contact piece 310a of the switch 310 after the rewinding operation at the lower speed, as described above, the contact piece 310a comes into contact with the contact piece 310b, so that the switch 310 is turned on. Accordingly, the input signal level fed from the inverter 221 to the reset terminal of the FF 214 is changed from "L" to "H" and the "H" level signal is fed to the rewinding control circuit 202 from the inverter 221. The rewinding control circuit 202 functions to change the base driving voltage level of the transistor 209 from "L" to "H", thereby turning off the transistor 209. Depending upon the turning off of the transistor 209, the transistor 210 is also turned off, so that the rotation of the motor 9 is stopped.

When the "H" level signal is applied to the reset terminal of the FF 214, depending upon &he closing operation of the switch 310, the output level of the Q terminal of the FF 214 changes from "H" to "L", so that the output level of the inverter 215a changes from "L" to "H", with the result that the analog switch 215b is turned on, while the analog switch 215c is turned off. Accordingly, the full voltage of the power source 3 is applied through the analog switch 215b to the transistor bridge circuit.

On the other hand, the output level of the inverter 221 changes from "L" to "H" and the output level of the inverter 222 changes from "H" to "L", depending upon the closing of the switch 310, so that the winding control circuit 203 is driven, whereby the "L" level voltage is applied from the winding control circuit 203 to the base of the transistor 211. Accordingly, the transistor 211 is turned on and then the transistor 212 is turned on, so that the current is fed to the motor 9 in the direction as indicated by the arrow B in FIG. 4, whereby the motor 9 starts its rotation in the film winding direction. In this case, the full-voltage is applied to the motor 9, which is rotated at the usual winding speed.

Therefore, in the embodiment as shown in FIGS. 10 and 11, the leader portion of the film is rewound at the usual rewinding speed at the initial s&age of the rewinding operation and after the edge Fa of the leader portion moves out of contact with the contact piece of the switch 311 the leader portion of the film is rewound at the lower speed. After completing the rewinding operation, the film is wound at the usual winding speed. Thus, the time required to rewind the leader portion of the film is reduced, because the rewinding speed is not reduced throughout the process of rewinding the leader portion of the film b reduced only at the final period of the rewinding process. Accordingly, there is no danger of the camera user losing patience at the time of rewinding operation.

Figure 13:
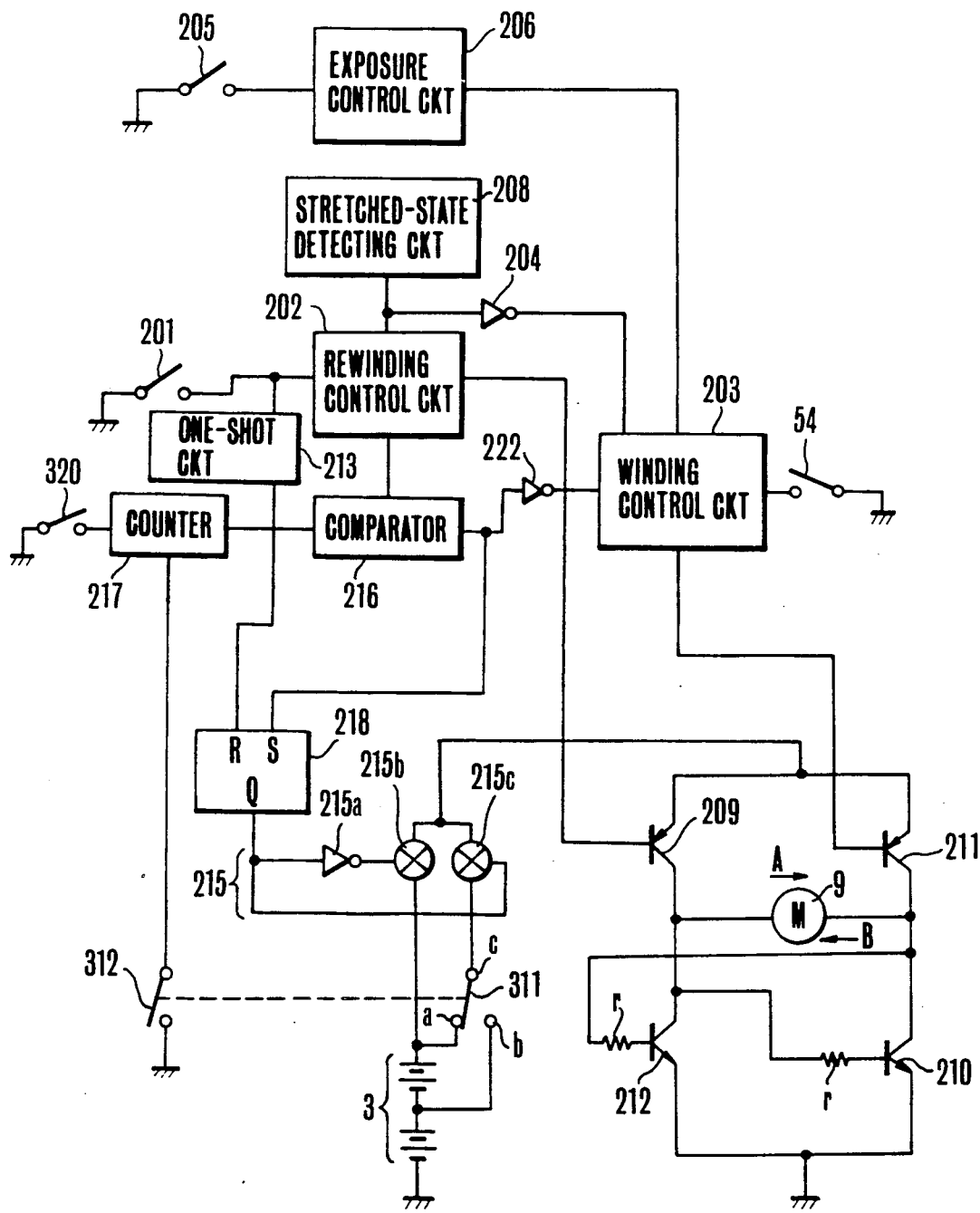

FIGS. 13 and 14 illustrates another modified form of the third embodiment of the present invention. In this modified form a switch 320 for detecting the number of the perforations formed at one side of the film is used, in place of the switch 310 as shown in FIGS. 10 and 11 (that is, the switch arranged to detect the existence or ron-existence of the leader portion of the film in the film entrance 18 and to detect the edge Fa of the leader portion of the film). This is a difference from the construction as shown in FIGS. 10 and 11. The parts which are the same as those shown in the above embodiments are indicated by the same symbols and the detailed explanation thereof is omitted.

The switch 320 as shown in FIG. 12 has a contact piece 320a arranged to drop into the perforations 324 of the film. This switch 320 is arranged to be turned on when the contact piece 320a drops into any one of the perforations 324 so that said contact piece 320a comes into contact with another contact piece 320b, while it is arranged to be turned off when the.forward end of the contact piece 320a comes into contact with the part of the film between the adjacent perforations so that said contact piece 320a comes out of contact with the contact piece 320b.

The circuit as shown in FIG. 13 includes a counter 217 for counting pulses produced by on-off operation of the switch 320, a switch 312 associated with said switch 311 to reset the counter 217, a comparator 216 which is arranged to apply a starting signal to the rewinding control circuit 202 when the counter 217 has counted a predetermined number, and a RS flip-flop (hereinafter referred to as "FF") which is arranged to set by the output of the one-shot circuit 213 and to reset by the output of the comparator 216. The other circuit elements are the same as those shown in FIG. 11.

The film loading operation of the camera according to this embodiment will be described with reference to FIG. 12 and 13.

When the film cartridge has been loaded into the camera and the closure 19 has been closed, the leader portion of the film F is held exposed outside the camera, as shown in FIG. 3, in the same manner as in &he above-described embodiments.

At this stage, the contact piece 311c is held apart from the contact piece 311b by the film and it is held in contact with the contact piece 311a, so that the contacts c and a of the switch 31 are connected with each other, as shown in FIG. 13. The switch 312 associated with the switch 311 is opened, so that the counter 217 is held in an inoperative state.

When the closure responsive switch 201 is closed, depending upon the closing of the closure 19, a signal is applied to the one-shot circuit 213 and the rewinding control circuit 202. As the switch 201 is closed, firstly the FF 218 is set and the voltage level at the Q terminal of said FF 218 becomes "H", so that the analog switch 215c is turned on while the analog switch 215b is turned off. Accordingly, the full voltage of the power source 3 is applied through the contacts c and a of the switch 311 to the transistor bridge.

On the other hand, the voltage level applied from the rewinding control circuit 202 to the base of the transistor 209 becomes "L" at the same time. Accordingly, the transistor 209 is turned on and the transistor 210 is turned on, so that the current is fed to the motor 9 in &he direction as indicated by the arrow A, whereby the motor 9 starts its rotation in the film rewinding direction at the usual rewinding speed (that is, at higher speed). Thus, the leader portion of the film F is retracted into the camera in the direction as indicated by the arrow in FIG. 12. When the edge Fa of the cut portion of the film leader portion moves out of contact with the contact piece 311c of the switch 311, the contact piece 311c moves away from the contact piece 113a and comes into contact with the contact piece 311b, so that the switch 311 is switched to cause the contact c to be connected with the contact b, in FIG. 13. At the same time, the switch 312 is turned on. Accordingly, the voltage applied to the motor 9 becomes ½ of the full voltage and, consequently, the motor 9 becomes rotated at lower speed. Thereafter, the leader portion of the film is rewound at lower speed than the usual rewinding speed.

When the switch 312 is turned on, the counter 217 is operated, and the pulse signals produced at every time when the contact piece 320a drops into the perforations 324 of the film are fed into the counter 217. The number of pulses counted by the counter 217 is applied to the comparator 216 in the form of a voltage proportional to the counted number, and the comparator 216 functions to compare said voltage with a predetermined reference voltage. When the voltage fed from the counter 217 to the comparator 216 becomes equal to said reference voltage (that is, when the number of the perforations detected by the switch 312 becomes equal to the predetermined number of the perforations of the leader portion of the film retracted into the camera), a "H" level signal is applied from the comparator 216 to the rewinding control circuit 202, the inverter 222 and the FF 218. Accordingly, the output level at the Q terminal of the FF 218 changes from "H" to "L", with the result that the analog switch 215b is turned on, while the analog switch 215c is turned off. Accordingly, the full voltage of the power source 3 is applied through the analog switch 215b to the transistor bridge circuit.

On the other hand, the rewinding control circuit 202 functions to change the voltage level applied to the base of the transistor 209 from "L" to "H", depending upon the "H" level signal fed from the comparator 216, so that the transistor 209 is turned off and then the transistor 210 is also turned off. Accordingly, the motor 9 is stopped.

The output level of the inverter 222 changes from "H" to "L", so that the winding control circuit 203 is driven and the voltage level applied from the winding control circuit 203 to the base of the transistor 211 changes from "H" to "L". Accordingly, the transistor 211 is turned on and the transistor 212 is also turned on. The current is fed to the motor 9 in the direction as indicated by the arrow B and, consequently, the motor 9 is rotated in the film winding direction. In this case, the full voltage of the power source 3 is applied to the motor 9, so that the film is wound at the usual winding speed.

Figure 15:
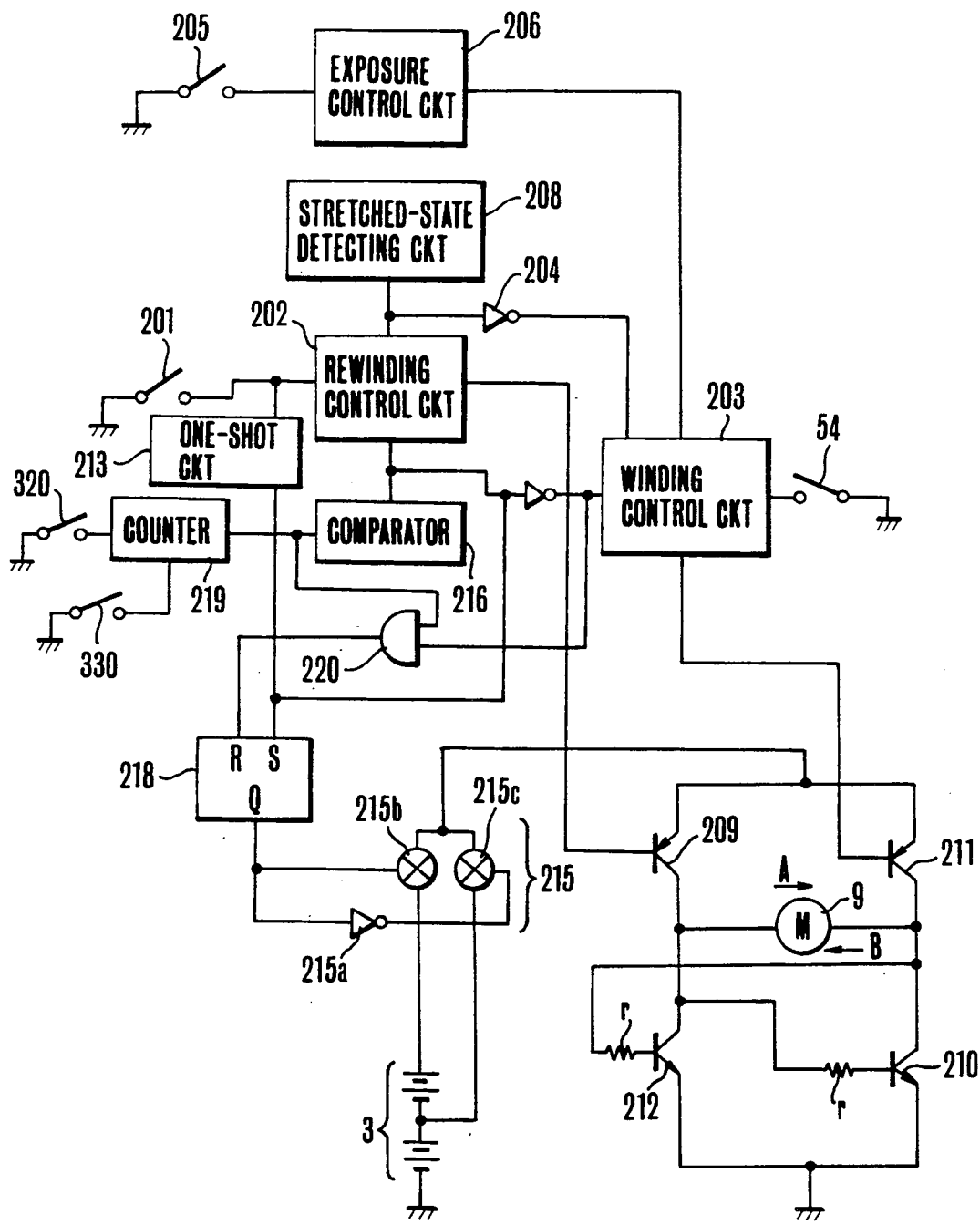

FIGS. 14 and 15 illustrate a further modified form of the third embodiment of the present invention. In the embodiment as shown in FIGS. 14 and 15, a switch 330 arranged to detect the upper edge Fa of the film leader portion and to detect the number of perforations 325 formed at a side of the film is used, in place of the switch 311 shown in FIGS. 12 and 13. This is a difference of this modified form from the embodiment shown in FIGS. 12 and 13.

The switch 330 has a contact piece 330a which is arranged to come into contact with another contact piece when said contact piece 330a drops into one of the perforations 325 of the film. The switch 320 has a contact piece 320a which is arranged to come into contact with another contact piece when said contact piece drops into one of the perforations 324 of the film.

FIG. 15 shows a control circuit including said switches 320 and 330. In FIG. 15, the constituent elements indicated by the same symbols as used in FIG. 13 are the same as those included in FIG. 13, respectively.

The circuit as shown in FIG. 15 includes a counter 219 which is arranged to count the pulses produced by the on-off operation of the switches 320 and 330. This counter 219 is different from the counter 217 as shown in FIG. 13 in such point that it generates and feeds an output pulse to the comparator 216 when the pulse input from one of the switches (320 or 330) disappears. This circuit includes an AND gate 220 which is arranged to reset the FF 218 when an output is produced from the counter 219 and an output is produced from the inverter 222 (that is, the output voltage level becomes "H").

Now the operation of the circuit, at the time of film loading of the camera having the above construction will be explained, with reference to FIGS. 14 and 15 and FIG. 3.

When the film cartridge has been loaded and the closure 19 has been closed, the leader portion of the film is exposed outside the camera through the film entrance 18, as shown in FIG. 3. At this stage, it is assumed that the forward end of the contact piece 330a of the switch 330 is located at the position of the perforations 325 at one side of the film and in contact with the film surface between the adjacent perforations 325. It is also assumed that the forward end of the contact piece 320a of the switch 320 is located at the position of the perforations 234 at the other side of the film and in contact with the film surface between the adjacent perforations 324.

When the closure responsive switch 201 is closed and a signal is applied to the one-shot circuit 213 and the rewinding control circuit 202, the FF 218 is set and the output voltage level at the Q terminal is changed from "L" to "H", so that the analog switch 215b becomes conductive, while the analog switch 215c becomes non-conductive. Accordingly, the transistor bridge circuit is connected through the analog switch 215b to the output terminal of the power source 3, so that the full voltage of the power source 3 is applied to the transistor bridge circuit.

On the other hand, a signal is fed from the closure responsive switch 201 to the rewinding control circuit 202, so that the rewinding control circuit 202 is driven and the voltage level applied from said circuit 202 to the base of the transistor 209 is changed from "H" to "L". Accordingly, the transistor 209 is turned on and then the transistor 210 is also turned on, whereby the current is fed to the motor 9 in the direction as indicated by the arrow A and the motor 9 is rotated in the film rewinding direction. At this stage, the full voltage of the power source 3 is applied through the analog switch 215b to the motor 9, as described above, so that the motor 9 is rotated in the usual rewinding speed. The fork 51 is rotated by the motor 9 and the film is rewound into the film cartridge. As the film is moved in rewinding direction, the forward ends of the contact pieces 320a and 330a of the switches 320 and 330, respectively, repeatedly drop into the perforations 325 and 324 of the film and the switches 320 and 330 produce on-off operations at every time they drop into the perforations 325 and 324. Thus the switches 320 and 330 produce pulses, which are fed into the counter 219.

As the film rewinding process proceeds, the contact piece 330a comes out of engagement with the film after the upper edge Fa of the leader portion of the film has passed the position of the forward end of the contact piece 330a and, consequently, the switch 330 stops generation of the pulse signal. After the switch 330 stops generation of the pulse signals, the counter 219 starts counting of the pulse signals fed from the switch 320 and produces an output corresponding to the number of counts, which is fed into the comparator 216. When the output is produced by the counter 219, the AND gate 220 becomes conductive (since the input level of the inverter 222 is "L" and the output level thereof is "H"). The FF 218 is reset and the output level at the Q terminal of the same is changed from "H" to "L". Accordingly, the analog switch 215b becomes non-conductive, while the switch 215c becomes conductive, so that ½ of the full voltage of the power source 3 is applied to the motor 9. Therefore, after this tine the rotating speed of the motor 9 is reduced, so that the film is rewound at the speed lower than the usual rewinding speed.

When the output signal of the counter 219 coincides with a predetermined reference voltage of the comparator 216 (which is determined to be equal to the number of the perforations existing between the edge Fa and the edge Fb of the film), the voltage level at the output terminal of the comparator is changed to "H", with the result that the output level of the inverter 207 becomes "L", so that the output level of the AND gate 220 becomes "L". At the same time the output of the comparator 216 is applied to the set terminal of the FF 218, so that the voltage level at the Q terminal of the FF 218 becomes "H", with the result that the analog switch 215b becomes conductive while the analog switch 215c becomes non-conductive. Accordingly, the full voltage of the power source 3 is applied to the power feeding circuit for the motor 9.

On the other hand, when the output level of the comparator 216 becomes "H", the output of the comparator 216 is applied to the rewinding control circuit 220 as a motor stopping signal and the voltage level applied from the rewinding control circuit 202 to the base of the transistor 209 is changed from "L" to "H". Accordingly, the transistor 209 and &he transistor 210 are turned off, so that the motor 9 is stopped.

The output of the comparator 216 is fed through the inverter 222 to the winding control circuit 203, thereby starting the winding control circuit 203 and the voltage level applied from the winding control circuit 203 to the base of the transistor 211 is changed from "H" to "L". Accordingly, after the transistor 211 has been turned on the transistor 212 is also turned on, so that the current is fed to the motor in the direction as indicated by the arrow B and the motor 9 is rotated in the film winding direction. As the result, the film is wound at the usual winding speed, since the full voltage of the power source 3 is applied to the motor 9.

In the descriptions of the embodiments as shown in FIGS. 8-15, the descriptions were made to the case where the rewinding speed is reduced by the electrical control method. However, it is to be noted that the rewinding speed may be reduced by a mechanical control method.

Figure 16:
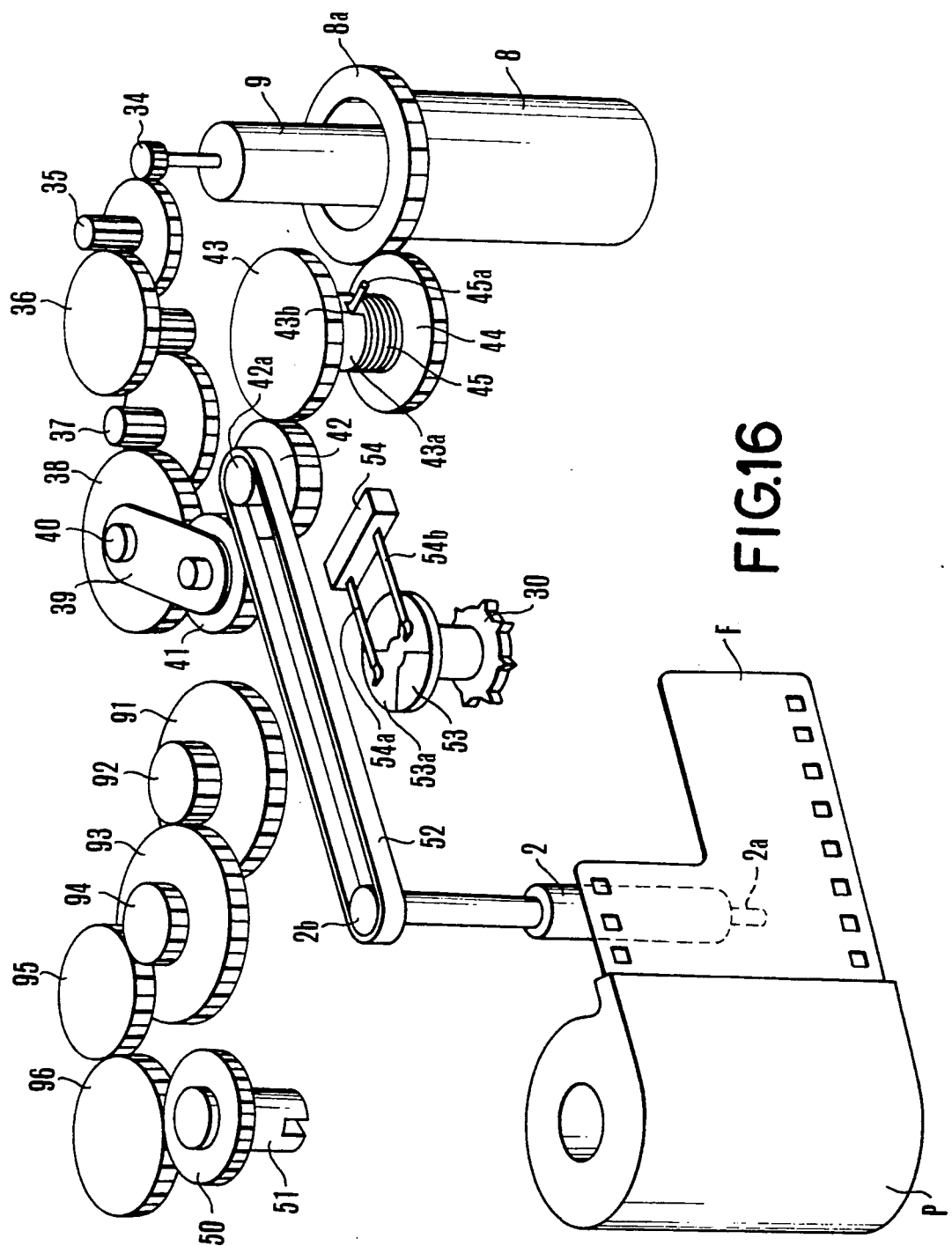
FIG. 16 is a perspective view showing a film feeding mechanism according to the other modified construction according to the third embodiment of the present invention.

FIG. 16 illustrates an embodiment of the present invention in which the rewinding speed is reduced as compared the winding speed by a mechanical means. This embodiment is characterized by the provision of a gear train 91-96 having larger reduction ratio than the gear train 46-49 as shown in FIG. 4, at the rewinding side of the film feeding mechanism. This embodiment, also includes the switch for detecting the leader portion of the film, in the same manner as in the other embodiments described above.

In the embodiment as shown in FIGS. 10-15, the retracting speed of the leader portion of the film into the camera is reduced from the intermediate stage of the retracting step. The embodiment as shown in FIGS. 10-15 may be so modified that the retracting speed of the leader portion of the film is low at the initial stage and it is increased from the intermediate stage of the retracting process. Such arrangement can be obtained by inverting the output signal of the contact piece of the switch for detecting the existence or non-existence of the upper edge of the leader portion of the film.

It will be understood that the present invention provides a camera which is arranged to allow easier loading of a film into the camera and which considerably improves performance and maneuverability of a camera, with substantial advantages.

What is claimed is:

1. A camera, comprising:
   (A) film pressing means for pressing a film onto an aperture;
   (B) a film cartridge chamber for housing a film cartridge in the camera;
   (C) closure means for closing said film cartridge chamber, while holding a leader portion of the film outside of the camera and the other portion of the film in such state that it is not subjected to the pressing of said pressing means,
   (D) first detecting means for detecting whether the leader portion of the film remains outside the camera;
   (E) second detecting means for detecting a closed state of said closure means; and
   (F) film feeding means arranged to retract the leader portion of the film remaining outside the camera into said camera and then wind up the leader portion of the film onto a film winding spool in response to detection of said leader portion of the film outside the camera effected by said first detecting means and detection of the closed state of said closure means effected by said second detecting means.

2. A camera according to claim 1, wherein said film pressing means includes a film pressing plate.

3. A camera according to claim 1, wherein said film feeding means includes film rewinding means arranged to rewind the leader portion of the film remaining outside the camera into the film cartridge in response to the detection of the leader portion of the film outside the camera by said first detecting means and the detection of the closed state of the closure of said closure means by said second detecting means, and film winding means arranged to wind up the film in response to the retraction of the leader portion of the film into the camera and the detection of the absence of the leader portion of the film outside the camera by said first detecting means.

4. A camera according to claim 1, further comprising:
   light shielding means disposed in a film entrance through which the leader portion of the film remaining outside the camera passes into the camera, to shield light from passing through said film entrance.

5. A camera according to claim 4, wherein said light shielding means comprises a movable light shielding means arranged to be pressed against one surface of the film when the film exists in said film entrance and moved across said film entrance when the film does not exist in the film entrance, thereby shielding incident light from passing through said film entrance.

6. A camera according to claim 5, wherein said first detecting means includes a movable contact piece arranged to energize said movable light shielding means across said film entrance.

7. A camera according to claim 5, further comprising:

a recess formed in opposite relation to said movable light shielding means across said film entrance, to receive said movable light shielding means.

8. A camera according to claim 1, wherein said film feeding means includes speed reducing means arranged to reduce the speed of the film when the leader portion of the film remaining outside the camera is retracted into the camera.

9. A camera according to claim 8, wherein said speed reducing means includes changeover means for reducing the speed of the leader portion of the film while retracting said leader portion of the film remaining outside the camera into said camera.

10. A camera to claim 8, in which said speed reducing means includes variable means for reducing the speed of the film when the leader portion of the film remaining outside the camera is retracted into the camera to a speed lower than a speed of the film at the time when it is wound.

11. A camera according to claim 10, wherein said speed reducing means includes changeover means for reducing the speed of the leader portion of the film while retracting said lead portion of the film remaining outside the camera into said camera.

12. A camera according to claim 9, wherein said changeover means includes detecting means for detecting a cut part of the leader portion of the film.

13. A camera according to claim 12, wherein said detecting means includes perforation responsive means responsive to perforations formed in the film.

14. A camera according to claim 1, wherein said first detecting means includes perforation responsive means responsive to perforations formed in the film.

15. A camera comprising:
(A) a film chamber for housing a film in the camera;
(B) closure means for closing said film chamber in such a state that a leader portion of said film remains outside the camera; and
(C) film feeding means arranged to retract the leader portion of the film remaining outside the camera into said camera and to then wind the film onto a film winding spool, wherein said film feeding means is arranged to reduce the speed of the film at the time when the leader portion of the film outside the camera is retracted into the camera.

16. A camera according to claim 15, wherein said film feeding means includes changeover means for reducing the speed of the leader portion of the film while retracting said leader portion of the film remaining outside the camera into said camera.

17. A camera according to claim 15, wherein said film feeding means includes variable means for reducing the speed of the film when the leader portion of the film remaining outside the camera is retracted into the camera to a speed lower than a speed of the film at the time when it is wound.

18. A camera according to claim 17, wherein said film feeding means includes changeover means for reducing the speed of the leader portion of the film while retracting said leader portion of the film remaining outside the camera into said camera.

19. A camera comprising:
a film take-up spool for winding a film thereon;
a film cartridge chamber for housing a film cartridge in the camera, said film cartridge adapted to contain the film;
openable closure means for closing an aperture providing access to the film cartridge chamber in which said film cartridge is loaded in a state whereby a leader portion of the film in the film cartridge extends through a film entrance and remains outside of the camera after the film cartridge chamber is closed;
limiting means for keeping the film even with reference to the aperture, said means not acting upon said film in the state in which the leader portion of said film remains outside of the camera, even if said closure means is closed to close the aperture; and
feeding means for retracting the leader portion of the film when the leader portion of the film remains outside of the camera and winding up said film on the film take-up spool.

20. A camera according to claim 19, wherein said feeding means comprises a motor.

21. A camera according to claim 19, wherein said limiting means comprises a pressing plate.

22. A camera according to claim 19, further comprising detection means for detecting the state of the leader portion of the film remaining outside of the camera.

23. A camera according to claim 22, wherein said film has a plurality of perforations therein, and wherein said detection means includes means responsive to the perforations of said film.

24. A camera according to claim 22, wherein said feeding means includes winding back means for winding said film back into said film cartridge in response to the detection of said detection means when the leader portion of said film remains outside of the camera.

25. A camera according to claim 24, wherein said feeding means includes winding up means for winding up said film upon said take-up spool in response to the detection of said detection means when the leader portion of said film is not outside of the camera.

26. A camera according to claim 22, wherein said feeding means includes winding up means for winding up said film upon said take-up spool in response to the detection of said detection means when the leader portion of said film is not outside of the camera.

27. A camera according to claim 19, further comprising first detection means for detecting the state of said closure means.

28. A camera according to claim 27, further including second detection means for detecting the state of the leader portion of the film outside of said camera.

29. A camera according to claim 28, wherein said feeding means includes a winding back means for winding said film back into said film cartridge when said first detection means detects the closure of said closure means and wherein said second detection means detects that the leader portion of said film is outside of said camera.

30. A camera according to claim 19, further comprising a light shielding means disposed in the film entrance through which the leader portion of the film remaining outside of the camera passes into the camera, to prevent the light from passing through said film entrance.

31. A camera according to claim 30, wherein said light shielding means comprises movable light shielding means movable along a direction across said film entrance.

32. A camera according to claim 31, further comprising detection means for detecting the state of the leader portion of the film outside of the camera, said detection means comprising switch means responsive to the movement of said movable light shielding means.

33. A camera according to claim 31, wherein said movable light shielding means comprises means movable along a direction across said film entrance in response to the absence of the film in said film entrance so as to shield the light from said film entrance.

34. A camera according to claim 31, wherein said camera has a recess therein which said movable light shielding means enters when said movable light shielding means shields the light from said film entrance.

35. A camera according to claim 19, wherein said feeding means feeds the film at a feeding speed, wherein said feeding means comprises speed reducing means for reducing the feeding speed when said feeding means retracts the leader portion of the film outside of the camera into the camera.

36. A camera according to claim 35, wherein said speed reducing means comprises change-over means for reducing, for a predetermined period, the feeding speed when said feeding means retracts the leader portion of the film outside of the camera into the camera.

37. A camera according to claim 35, wherein said speed reducing means comprises variable means for reducing the speed at which the leader portion of the film remaining outside of the camera is retracted into said camera to a speed lower than that at which the film is wound upon on said take-up spool.

38. A camera according to claim 37, wherein said speed reducing means comprises change-over means for reducing, for a predetermined period, the feeding speed when said feeding means retracts the leader portion of the film outside of the camera into the camera.

39. A camera according to claim 19, further comprising protection means for prohibiting the leader portion of the film from being drawn through said aperture.

40. A camera according to claim 19, wherein said feeding means comprises a film feeding portion disposed between said aperture and said film cartridge.

41. A camera comprising:
a film take-up spool for winding of film thereon;
a film cartridge chamber for housing a film cartridge in the camera, said cartridge adapted to contain the film, and said cartridge being housed in said film cartridge chamber in a state in which a leader portion of the film in the film cartridge extends through a film entrance and remains outside of the camera after the film cartridge chamber is closed,
limiting means for maintaining the evenness of said film with respect to the aperture;
cover means for opening and closing said film cartridge chamber without moving said limiting means; and
feeding means for retracting the leader portion of said film when said film remains outside of the camera into the camera so as to wind said film up on said film take-up spool.

42. A camera according to claim 41, wherein said feeding means comprises a motor.

43. A camera means according to claim 41, wherein said limiting means comprises a pressing plate.

44. A camera according to claim 41, further comprising detection means for detecting the state of the leader portion of the film remaining outside of the camera.

45. A camera according to claim 44, wherein said feeding means includes winding back means for winding said film back into said film cartridge in response to the detecting of said detection means when the leader portion of said film is outside of the camera.

46. A camera according to claim 45, wherein said feeding means includes winding up means for winding up said film upon said take-up spool in response to the detecting of said detection means when the leader portion of said film is not outside of the camera.

47. A camera according to claim 44, wherein said feeding means includes winding up means for winding up said film upon said take-up spool in response to the detecting of said detection means when the leader portion of said film is not outside of the camera.

48. A camera according to claim 41, wherein said light shielding means comprises movable light shielding means movable along a direction across said film entrance.

49. A camera according to claim 41, wherein said feeding means feeds the film at a feeding speed, wherein said feeding means comprises speed reducing means for reducing the feeding speed when said feeding means retracts the leader portion of the film outside of the camera into the camera.

50. A camera according to claim 49, wherein said speed reducing means comprises change-over means for reducing, for a predetermined period, the feeding speed when said feeding means retracts the leader portion of the film outside of the camera into the camera.

51. A camera according to claim 49, wherein said speed reducing means comprises variable means for reducing the speed at which the leader portion of the film outside of the camera is retracted into said camera to a speed lower than that at which the film is wound upon on said take-up spool.

52. A camera according to claim 41, further comprising protection means for prohibiting the leader portion of said film from being drawn into said aperture.

53. A camera according to claim 42, wherein said feeding means includes a film feeding portion disposed between said aperture and said film cartridge.

54. A camera comprising:
a film cartridge chamber for housing a film cartridge in the camera, wherein said film cartridge is adapted to contain a film and is housed in said film cartridge chamber in a state in which a leader portion of the film remains outside of the camera; and
film feeding means for retracting the leader portion of the film remaining outside the camera into the camera and then winding the film onto a take-up spool at a feeding speed, said film feeding means comprising means for reducing the feeding speed of the film when the leader portion of the film outside the camera is retracted into the camera.

55. A camera according to claim 54, wherein said speed reducing means comprises change-over means for reducing the feeding speed for a predetermined period when said feeding means retracts the leader portion of the film outside of the camera into the camera.

56. A camera according to claim 54, wherein said speed reducing means includes a variable means for reducing the speed at which the leader portion of the film outside of the camera is retracted into said camera to a speed lower than at which the film is wound up on said take-up spool.

57. A camera according to claim 56, wherein said speed reducing means includes change-over means for reducing the feeding speed for a predetermined period when said feeding means retracts the leader portion of the film outside of the camera into the camera.

58. A camera comprising:
a film take-up spool for winding a film thereon;

a film cartridge chamber for housing a film cartridge in the camera, wherein said film cartridge is adapted to contain a film and is housed in said film cartridge chamber in a state in which a leader portion of the film remains outside of the camera; and film feeding means for retracting the film remaining outside of the film cartridge housed in said film cartridge chamber into said film cartridge and then winding up said film on said take-up spool at a feeding speed, said feeding means comprising means for reducing the feeding speed when the film outside of said film cartridge is retracted into said film cartridge.

59. A camera according to claim 58, wherein said speed reducing means comprises change-over means for reducing the feeding speed for a predetermined period when the film cartridge.

60. A camera according to claim 58, wherein said speed reducing means comprises variable means for reducing the speed at which the film remaining outside of said film cartridge is retracted into said film cartridge to a speed lower than that at which said film is wound on said take-up spool.

61. A camera according to claim 60, wherein said speed reducing means comprises change-over means for reducing the feeding speed for a predetermined period when the film outside of said film cartridge is wound into said film cartridge.

* * * * *

UNITED STATES PATENT AND TRADEMARK OFFICE
CERTIFICATE OF CORRECTION

PATENT NO. : 5,061,950　　　　　　　　　　Page 1 of 10
DATED : October 29, 1991
INVENTOR(S) : TOYOTOSHI SUZUKI, ET AL.

It is certified that error appears in the above-identified patent and that said Letters Patent is hereby corrected as shown below:

On title page, item
[56] References Cited:
U.S. PATENT DOCUMENTS

Add the following:

--3,519,340　7/1970　Vockenhuber et al.　352/72
　4,506,965　3/1985　Kitajima et al.　　354/173.1
　4,504,131　3/1985　Kimura　　　　　　 354/173.1
　4,460,256　7/1984　Araki et al.　　　 354 173.11 --

FOREIGN PATENT DOCUMENTS

Line 1, "57-201221　12/1952　Japan ." should read
　　　--57-201221　12/1982　Japan.--;
Line 2, please add:

--50-115816　　9/1975　　Japan
　53-68220　　 6/1978　　Japan
　54-26722　　 2/1979　　Japan
　54-26723　　 2/1979　　Japan
　54-26725　　 2/1979　　Japan
　55-143550　 11/1980　　Japan
　57-201221　 12/1982　　Japan--

COLUMN 1:

Line 31, "cf" should read --of--;
Line 33, "cf" should read --of--;
Line 60, "operates" should read --operates while holding a leader--;

UNITED STATES PATENT AND TRADEMARK OFFICE
CERTIFICATE OF CORRECTION

PATENT NO. : 5,061,950
DATED : October 29, 1991
INVENTOR(S) : Toyotoshi Suzuki, et al.

It is certified that error appears in the above-indentified patent and that said Letters Patent is hereby corrected as shown below:

Line 64, "to" should read --of--; and
Line 66, "arranged" should read --are arranged--.

COLUMN 3:

Line 48, "parts 1c" should read --part 1c--.

COLUMN 4:

Line 5, "if" should read --1f--; and
Line 59, "or" should read --of--.

COLUMN 5:

Line 12, "gear 12" should read --gear 42--; and
Line 28, "engagement&" should read --engagement--.

COLUMN 7:

Line 36, "&he" should read --the--; and
Line 37, "A" should read --At--.

UNITED STATES PATENT AND TRADEMARK OFFICE
CERTIFICATE OF CORRECTION

PATENT NO. : 5,061,950
DATED : October 29, 1991
INVENTOR(S) : TOYOTOSHI SUZUKI, ET AL.

It is certified that error appears in the above-identified patent and that said Letters Patent is hereby corrected as shown below:

COLUMN 8:

Line 10, "70" should read --71--;
Line 21, "&he" should read --the--;
Line 48, "reaches" should read --reach--;
Line 51, "at" should be deleted;
Line 63, "circuit&" should read --circuit--.

COLUMN 9:

Line 5, "so that" should be deleted;
Line 22, "posit-on" should read --position--;
Line 62, "&he" should read --the--;
Line 65, "that" should read --(that--; and
Line 68, "recess 19." should read --recess 19d.--.

COLUMN 10:

Line 25, "be," should read --,--;
Line 42, "&turned" should read --turned--;
Line 43, "contact&" should read --contact--; and
Line 44, "(that&" should read --(that--.

UNITED STATES PATENT AND TRADEMARK OFFICE
CERTIFICATE OF CORRECTION

PATENT NO. : 5,061,950

DATED : October 29, 1991

INVENTOR(S) : TOYOTOSHI SUZUKI, ET AL.

It is certified that error appears in the above-identified patent and that said Letters Patent is hereby corrected as shown below:

COLUMN 11:

Line 6, "but&on" should read --button--;
Line 25, "a&" should read --at--; and
Line 27, "as" should read --as a--.

COLUMN 12:

Line 32, "41," should read --42,--; "spool 3" should read --spool 8--; and "roll" should read --roller--;
Line 39, "cf" should read --of--; and
Line 59, "transistor 201" should read --201--.

COLUMN 13:

Line 6, "state a" should read --a state--;
Line 14, "lever 38" should read --gear 39--; and
Line 61, "shown)" should read --shown).--.

UNITED STATES PATENT AND TRADEMARK OFFICE
CERTIFICATE OF CORRECTION

PATENT NO. : 5,061,950

DATED : October 29, 1991

INVENTOR(S) : TOYOTOSHI SUZUKI, ET AL.

It is certified that error appears in the above-identified patent and that said Letters Patent is hereby corrected as shown below:

COLUMN 14:

Line 39, "charged" should read --changed--; and
Line 60, "cf" should read --of--.

COLUMN 16:

Line 6, "reference" should read --reference to--; and
Line 23, "piece 310a," should read --piece 310b,--.

COLUMN 17:

Line 18, "&he" should read --the--;
Line 43, "s&age" should read --stage--;
Line 52, "b" should read --but--;
Line 56, "illustrates" should read --illustrate--; and
Line 62, "ron-existence" should read --non-existence--.

COLUMN 18:

Line 19, "to" should read --to be--;
Line 20, "to" should read --to be--;

UNITED STATES PATENT AND TRADEMARK OFFICE
CERTIFICATE OF CORRECTION

PATENT NO. : 5,061,950

DATED : October 29, 1991

INVENTOR(S) : TOYOTOSHI SUZUKI, ET AL.

It is certified that error appears in the above-identified patent and that said Letters Patent is hereby corrected as shown below:

Line 29, "&he" should read --the--;
    Line 34, "switch 31" should read --switch 311--;
    Line 53, "&he" should read --the--; and
    Line 62, "113a" should read --311a--.

COLUMN 19:

Line 16, "a" should read --an--.

COLUMN 20:

Line 54, "at" should be deleted.

COLUMN 21:

Line 7, "tine" should read --time--;
    Line 28, "circuit 220" should read --circuit 202--;
    Line 32, "&he" should read --the--; and
    Line 54, "compared" should read --compared to--.

UNITED STATES PATENT AND TRADEMARK OFFICE
CERTIFICATE OF CORRECTION

PATENT NO. : 5,061,950
DATED : October 29, 1991
INVENTOR(S) : Toyotoshi Suzuki, et al.

It is certified that error appears in the above-indentified patent and that said Letters Patent is hereby corrected as shown below:

COLUMN 22:

Line 20, "means," should read --means;--; and
Line 30, "onto" should read --to--.

COLUMN 23:

Line 14, "to" should read --according to--;
Line 18, "lower" should read --slower--;
Line 23, "lead" should read --leader--;
Line 55, "lower" should read --slower--; and
Line 63, "thereon;" should read --thereto--.

COLUMN 24:

Line 2, "whereby" should read --wherein--;
Line 4, "camera after the film cartridge" should read --camera;--;
Line 5, "chamber is closed;" should be deleted;
Line 33, "upon" should read --onto--; and
Line 39, "upon" should read --onto--.

UNITED STATES PATENT AND TRADEMARK OFFICE
CERTIFICATE OF CORRECTION

PATENT NO. : 5,061,950

DATED : October 29, 1991

INVENTOR(S) : TOYOTOSHI SUZUKI, ET AL.

It is certified that error appears in the above-identified patent and that said Letters Patent is hereby corrected as shown below:

COLUMN 25:

Line 17, "change-over" should read --changeover--;

Line 25, "lower" should read --slower--;

Line 26, "on" should read --onto--;

Line 28, "change-over" should read --changeover--;

Line 34, "being drawn through" should read --falling into--;

Line 40, "thereon;" should read --thereto--;

Line 47, "camera after the film cartridge chamber is closed," should read --camera;--

Line 55, "up on" should read --onto--; and

Line 59, "means" should be deleted.

COLUMN 26:

Line 3, "upon" should read --onto--;

Line 8, "upon" should read --onto--;

Line 22, "change-over" should read --changeover--;

Line 30, "lower" should read --slower--;

Line 31, "upon on" should read --onto--;

Line 34, "being drawn" should read --falling--;

Line 35, "claim 42," should read --claim 41,--;

UNITED STATES PATENT AND TRADEMARK OFFICE
CERTIFICATE OF CORRECTION

PATENT NO. : 5,061,950

DATED : October 29, 1991

INVENTOR(S) : TOYOTOSHI SUZUKI, ET AL.

It is certified that error appears in the above-identified patent and that said Letters Patent is hereby corrected as shown below:

Line 52, "change-over" should read --changeover--;

Line 60, "lower" should read --slower--, and "up on" should read --onto--;

Line 63, "change-over" should read --changeover--; and

Line 68, "thereon;" should read --thereto;--.

COLUMN 27:

Line 9, "on" should read --onto--; and

Line 15, "change-over" should read --changeover--.

UNITED STATES PATENT AND TRADEMARK OFFICE
CERTIFICATE OF CORRECTION

PATENT NO. : 5,061,950
DATED : October 29, 1991
INVENTOR(S) : Toyotoshi Suzuki, et al It is certified that error appears in the above-indentified patent and that said Letters Patent is hereby corrected as shown below:

<u>COLUMN 28</u>:

Line 2, "film cartridge." should read --film outside of said film cartridge is retracted into said film cartridge.--;
Line 7, "lower" should read --slower--;
Line 8, "on" should read --onto--;
Line 10, "change-over" should read --changeover--; and
Line 12, "wound" should read --retracted--.

Signed and Sealed this

Twenty-ninth Day of November, 1994

Attest:

BRUCE LEHMAN

Attesting Officer     Commissioner of Patents and Trademarks